US012065714B2

(12) United States Patent
Olvera Olmedo et al.

(10) Patent No.: US 12,065,714 B2
(45) Date of Patent: *Aug. 20, 2024

(54) METHOD FOR CARBON-CATALYSED THIOSULFATE LEACHING OF GOLD-BEARING MATERIALS

(71) Applicant: Barrick Gold Corporation, Toronto (CA)

(72) Inventors: Oscar German Olvera Olmedo, Vancouver (CA); Daniel Feliks Raphael Domanski, Vancouver (CA)

(73) Assignee: Barrick Gold Corporation, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/122,279

(22) Filed: Mar. 16, 2023

(65) Prior Publication Data

US 2023/0313336 A1    Oct. 5, 2023

Related U.S. Application Data

(63) Continuation of application No. 16/748,523, filed on Jan. 21, 2020, now Pat. No. 11,639,540.
(Continued)

(51) Int. Cl.
   *C22B 11/00* (2006.01)
   *C22B 3/42* (2006.01)
(52) U.S. Cl.
   CPC ............. *C22B 11/04* (2013.01); *C22B 3/42* (2013.01)
(58) Field of Classification Search
   CPC ............. C22B 11/04; C22B 3/42; Y02P 10/20
   (Continued)

(56) References Cited

U.S. PATENT DOCUMENTS

| 496,951 A | 5/1893 | Parkes |
| 1,627,582 A | 5/1927 | Terry |

(Continued)

FOREIGN PATENT DOCUMENTS

| AU | 4576985 | 6/1986 |
| AU | 574818 | 7/1988 |

(Continued)

OTHER PUBLICATIONS

Sitando, Onias, Gold Leaching in Thiosulfate-Oxygen Solutions, Thesis, Murdoch University, published 2017 (Year: 2017).*

(Continued)

*Primary Examiner* — Brian D Walck
*Assistant Examiner* — Danielle Carda
(74) *Attorney, Agent, or Firm* — Sheridan Ross P.C.

(57) ABSTRACT

The present disclosure is directed to a gold recovery process in which activated carbon or another carbon-based material is used to accelerate thiosulfate leaching of gold from a gold-bearing material. The present disclosure improves the overall precious metal recovery of thiosulfate refractory precious metal-bearing materials. Leaching is done by substantially simultaneously mixing a slurry containing the precious metal-bearing material, water, thiosulfate, a carbon-based material, and dissolved molecular oxygen (as the oxidizing reagent) and performing leaching in the presence of the various components for a predetermined residence time. The carbon-based material is maintained in the slurry during leaching to provide increased gold recoveries.

20 Claims, 14 Drawing Sheets

Related U.S. Application Data

(60) Provisional application No. 62/819,005, filed on Mar. 15, 2019, provisional application No. 62/794,887, filed on Jan. 21, 2019.

(58) Field of Classification Search
USPC .......................................................... 75/744
See application file for complete search history.

(56) References Cited

U.S. PATENT DOCUMENTS

| | | | |
|---|---|---|---|
| 3,317,313 | A | 5/1967 | Biiggs |
| 3,454,503 | A | 7/1969 | Blankenhorn |
| 3,524,724 | A | 8/1970 | Every et al. |
| 3,833,351 | A | 9/1974 | Neskora et al. |
| 3,843,771 | A | 10/1974 | Urban |
| 3,902,896 | A | 9/1975 | Borbely et al. |
| 3,979,207 | A | 9/1976 | MacGregor |
| 4,070,182 | A | 1/1978 | Genik-Sas-Berezowsky et al. |
| 4,155,810 | A | 5/1979 | Kitajima et al. |
| 4,256,706 | A | 3/1981 | Heinen et al. |
| 4,269,622 | A | 5/1981 | Kerley, Jr. |
| 4,289,532 | A | 9/1981 | Matson et al. |
| 4,296,075 | A | 10/1981 | Yan |
| 4,304,644 | A | 12/1981 | Victorovich et al. |
| 4,369,061 | A | 1/1983 | Kerley, Jr. |
| 4,384,889 | A | 5/1983 | Wiewiorowski et al. |
| 4,411,612 | A | 10/1983 | Holland |
| 4,411,873 | A | 10/1983 | Yan |
| 4,489,984 | A | 12/1984 | Savins |
| 4,510,027 | A | 4/1985 | Wiewiorowski et al. |
| 4,528,166 | A | 7/1985 | McDougall |
| 4,552,589 | A | 11/1985 | Mason et al. |
| 4,571,264 | A | 2/1986 | Weir et al. |
| 4,585,561 | A | 4/1986 | Zlokarnik et al. |
| 4,605,439 | A | 8/1986 | Weir |
| 4,632,701 | A | 12/1986 | Genik-Sas-Berezowsky et al. |
| 4,634,187 | A | 1/1987 | Huff et al. |
| 4,654,078 | A | 3/1987 | Perez et al. |
| 4,654,079 | A | 3/1987 | Nunez et al. |
| 4,684,404 | A | 8/1987 | Kalocsai |
| 4,721,526 | A | 1/1988 | Elmore et al. |
| 4,723,998 | A | 2/1988 | O'Neil |
| 4,738,718 | A | 4/1988 | Bakshani et al. |
| 4,740,243 | A | 4/1988 | Krebs-Yuill et al. |
| 4,758,413 | A | 7/1988 | Harris et al. |
| 4,765,827 | A | 8/1988 | Clough et al. |
| 4,778,519 | A | 10/1988 | Pesic |
| 4,801,329 | A | 1/1989 | Clough et al. |
| 4,816,234 | A | 3/1989 | Brison et al. |
| 4,816,235 | A | 3/1989 | Pesic |
| 4,902,345 | A | 2/1990 | Ball et al. |
| 4,913,730 | A | 4/1990 | Deschenes et al. |
| 4,923,510 | A | 5/1990 | Ramadorai et al. |
| 4,925,485 | A | 5/1990 | Schulze |
| 4,980,134 | A | 12/1990 | Butler |
| 5,051,128 | A | 9/1991 | Kubo |
| 5,071,477 | A | 12/1991 | Thomas et al. |
| 5,114,687 | A | 5/1992 | Han et al. |
| 5,127,942 | A | 7/1992 | Brierley et al. |
| 5,147,617 | A | 9/1992 | Touro et al. |
| 5,147,618 | A | 9/1992 | Touro et al. |
| 5,215,575 | A | 6/1993 | Butler |
| 5,232,490 | A | 8/1993 | Bender et al. |
| 5,236,492 | A | 8/1993 | Shaw et al. |
| 5,244,493 | A | 9/1993 | Brierley et al. |
| 5,246,486 | A | 9/1993 | Brierley et al. |
| 5,308,381 | A | 5/1994 | Han et al. |
| 5,338,338 | A | 8/1994 | Kohr |
| 5,340,380 | A | 8/1994 | Virnig |
| 5,344,479 | A | 9/1994 | Kerfoot et al. |
| 5,354,359 | A | 10/1994 | Wan et al. |
| 5,364,453 | A | 11/1994 | Kohr |
| 5,385,668 | A | 1/1995 | Greenhalgh et al. |
| 5,405,430 | A | 4/1995 | Groves et al. |
| 5,443,621 | A | 8/1995 | Kohr |
| 5,484,470 | A | 1/1996 | Kristjansdottir et al. |
| 5,489,326 | A | 2/1996 | Thomas et al. |
| 5,536,297 | A | 7/1996 | Marchbank et al. |
| 5,536,480 | A | 7/1996 | Simmons |
| 5,601,630 | A | 2/1997 | Hoecker |
| 5,607,619 | A | 3/1997 | Dadgar et al. |
| 5,626,647 | A | 5/1997 | Kohr |
| 5,653,945 | A | 8/1997 | Gathje et al. |
| 5,672,194 | A | 9/1997 | Hunter et al. |
| 5,683,490 | A | 11/1997 | Earley, III et al. |
| 5,733,431 | A | 3/1998 | Green et al. |
| 5,785,736 | A | 7/1998 | Thomas et al. |
| 5,837,210 | A | 11/1998 | Simmons |
| 5,876,588 | A | 3/1999 | Lalancette et al. |
| 5,939,034 | A | 8/1999 | Virnig et al. |
| 5,961,833 | A | 10/1999 | Green et al. |
| 6,156,186 | A | 12/2000 | Mueller et al. |
| 6,165,344 | A | 12/2000 | Green et al. |
| 6,180,072 | B1 | 1/2001 | Veal et al. |
| 6,183,706 | B1 | 2/2001 | King |
| 6,197,214 | B1 | 3/2001 | Virnig et al. |
| 6,248,301 | B1 | 6/2001 | Hannaford et al. |
| 6,251,163 | B1 | 6/2001 | King |
| 6,344,068 | B1 | 2/2002 | Fleming et al. |
| 6,350,420 | B1 | 2/2002 | Duyvesteyn et al. |
| 6,355,175 | B1 | 3/2002 | Green et al. |
| 6,368,381 | B1 | 4/2002 | King et al. |
| 6,451,275 | B1 | 9/2002 | Fleming |
| 6,500,231 | B1 | 12/2002 | Wan |
| 6,602,319 | B1 | 8/2003 | Murthy et al. |
| 6,632,264 | B2 | 10/2003 | Zhang et al. |
| 6,641,642 | B2 | 11/2003 | Simmons et al. |
| 6,660,059 | B2 | 12/2003 | Ji et al. |
| 7,066,983 | B2 | 6/2006 | Ji et al. |
| 7,544,232 | B2 | 6/2009 | Hackl et al. |
| 7,559,974 | B2 | 7/2009 | Ji et al. |
| 7,572,317 | B2 | 8/2009 | Choi et al. |
| 7,704,298 | B2 | 4/2010 | Ji et al. |
| 7,722,840 | B2 | 5/2010 | Hackl et al. |
| 7,985,277 | B2 | 7/2011 | Xia et al. |
| 8,097,227 | B2 | 1/2012 | Ji et al. |
| 8,273,237 | B2 | 9/2012 | Marsden et al. |
| 8,597,399 | B2 | 12/2013 | Ji et al. |
| 8,715,389 | B2 | 5/2014 | Choi et al. |
| 8,821,613 | B2 | 9/2014 | Ji et al. |
| 9,051,625 | B2 | 6/2015 | Choi et al. |
| 9,790,572 | B2 | 10/2017 | Choi et al. |
| 10,161,016 | B2 | 12/2018 | Choi et al. |
| 10,415,116 | B2 | 9/2019 | Choi et al. |
| 10,597,752 | B2 | 3/2020 | Choi et al. |
| 11,401,580 | B2 | 8/2022 | Choi et al. |
| 11,639,540 | B2 | 5/2023 | Olmedo et al. |
| 2002/0092377 | A1* | 7/2002 | Ji .................. C22B 3/08 75/631 |
| 2003/0154822 | A1 | 8/2003 | Hall et al. |
| 2004/0258588 | A1 | 12/2004 | Buseth et al. |
| 2005/0066774 | A1 | 3/2005 | Asano et al. |
| 2007/0056909 | A1 | 3/2007 | Zontov |
| 2009/0056500 | A1 | 3/2009 | Mendes |
| 2009/0071296 | A1 | 3/2009 | Hillier et al. |
| 2010/0058893 | A1 | 3/2010 | Zontov |
| 2011/0011216 | A1 | 1/2011 | Jeffrey |
| 2011/0030508 | A1 | 2/2011 | Dreisinger et al. |
| 2012/0304828 | A1 | 12/2012 | Sano et al. |
| 2014/0047954 | A1 | 2/2014 | Ji et al. |
| 2014/0356225 | A1* | 12/2014 | Choi .................. C22B 11/04 75/744 |

FOREIGN PATENT DOCUMENTS

| | | |
|---|---|---|
| AU | 1852599 | 9/1999 |
| AU | 752203 | 9/2002 |
| AU | 760740 | 5/2003 |
| AU | 783904 | 12/2005 |
| CA | 2209559 | 1/1998 |
| CA | 2315480 | 2/2001 |
| CA | 2412352 | 5/2004 |
| CA | 2449467 | 5/2004 |
| CA | 2698578 | 7/2014 |

(56) References Cited

FOREIGN PATENT DOCUMENTS

| | | |
|---|---|---|
| CL | 38972 | 9/1995 |
| CL | 45360 | 6/2009 |
| CL | 52952 | 8/2016 |
| EP | 316094 | 5/1989 |
| EP | 522978 | 1/1993 |
| EP | 1433860 | 6/2004 |
| EP | 2821513 | 1/2015 |
| EP | 3004407 | 4/2016 |
| GB | 1378052 | 12/1974 |
| GB | 1423342 | 2/1976 |
| GB | 2180829 | 4/1987 |
| GB | 2310424 | 8/1997 |
| JP | S50-155422 | 12/1975 |
| JP | S53-59254 | 5/1978 |
| JP | 60208434 | 10/1985 |
| JP | 2004-018939 | 1/2004 |
| JP | 2012-214865 | 11/2012 |
| JP | 2014-516019 | 7/2014 |
| RU | 2268316 | 1/2006 |
| SU | 1279954 | 12/1986 |
| SU | 1284942 | 1/1987 |
| WO | WO 90/15887 | 12/1990 |
| WO | WO 91/11539 | 8/1991 |
| WO | WO 94/06944 | 3/1994 |
| WO | WO 95/04164 | 2/1995 |
| WO | WO 97/49474 | 12/1997 |
| WO | WO 99/13116 | 3/1999 |
| WO | WO 01/23626 | 4/2001 |
| WO | WO 01/36333 | 5/2001 |
| WO | WO 01/42519 | 6/2001 |
| WO | WO 01/88212 | 11/2001 |
| WO | WO 02/27045 | 4/2002 |
| WO | WO 03/060172 | 7/2003 |
| WO | WO 2003/080879 | 10/2003 |
| WO | WO 2004/005556 | 1/2004 |
| WO | WO 2005/017215 | 2/2005 |
| WO | WO 2013/129017 | 7/2015 |
| ZA | 770840 | 1/1978 |

OTHER PUBLICATIONS

Abbruzzese et al., "Thiosulphate Leaching for Gold Hydrometallurgy", Hydrometallurgy 39, 1995, pp. 265-276.
Ablimt et al., "Study on Intensified Leaching of Gold with Thiosulfate", Zingjiang Res Inst of Chemistry, PRC, vol. 20 (1), 1999, pp. 39-41.
Adams, "The chemical behaviour of cyanide in the extraction of gold. 2. Mechanisms of cyanide loss in the carbon-in-pulp process," J. South African Inst. Mining & Metallurgy, 1990, vol. 90(3), pp. 67-73.
Adams et al., "Characterization and Blinding of Carbonaceous Preg-Robbers in Gold Ores", Minerals Engineering, Pregamon Press, Oxford, Great Britain, vol. 11 No. 10, Oct. 1998, pp. 919-927.
Agadzhanyan et al., "Kinetics of Ion Exchange in Selective Systems. II. Kinetics of the Exchange of Differently charged Ions in a Macroporous ion Exchanger", Published in the Russian Journal of Physical Chemistry, 61(7), 1987, pp. 994-997.
Anderson, et al., "Leaching of Antimony From a Refractory Precious Metals Concentrate," Hydrometallurgy: Fundamentals, technology and innovations, Society for Mining, Metallurgy and Exploration, 1993, pp. 341-363.
Anzhang, Mao et al., "One-Step Leaching of Some Refractory Gold Concentrate Containing Arsenic and Theory Analysis," J. Cent. South Univ. Technol., vol. 4, No. 2 (Nov. 1997).
Atluri et al., "Recovery of Gold and Silver from Ammoniacal Thiosulfate Solutions Containing Copper by Resin ion Exchange Method" A Thesis Submitted to the Faculty of the Department of Materials Science and Engineering at the University of Arizona, 1987, 219 pages.
Atluri et al., "Recovery of Silver from Ammoniacal Thiosulfate Solutions", Published in Proceedings of a Symposium on Precious and Rare Metals held in Albuquerque, NM, Apr. 6-8, 1988, pp. 290-305.
Awadalla et al., "Recovery of Gold from Thiourea, Thiocyanate, or Thiosulfate Solutions by Reduction-Precipitation with a Stabilized Form of Sodium Borohydride", published in Separation Science and Technology, 26(9), 1991, pp. 1207-1228.
Aylmore et al., "Thermodynamic Analysis of Gold Leaching by Ammoniacal Thiosulfate Using Eh/pH Speciation Diagrams", Minerals & Metallurgical Processing, vol. 16, No. 4, Nov. 2001, pp. 221-227.
Balasanian, Ion et al., "Modeling A Process for Sodium Thiosulfate Production from Sulfite and Sulfur,"Revista de Chimie, vol. 26, No. 6 (1975), pp. 475-479.
Bartels, "Chemical Abstract Index Compilation for Thiosalts and Related Compounds", Report dated Nov. 1978, A1-A17, pp. 1-5.
Bartlett, "Metal Extraction from Ores by Heap Leaching"; Metallurgical and Materials Transactions B; vol. 28B, Aug. 1997; pp. 529-545.
Benedetti, Marc and Boulegue, "Mechanism of Gold Transfer and Deposition in a Supergene Environment", Geochimica Et Cosmochimica Acta, vol. 55, 1991, pp. 1539-1547.
Bennet et al., "A Comprehensive Copper Stockpile Leach Model: Background and Model Formulation" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 315-328.
Berezowsky et al., "Recovery of Gold and Silver from Oxidation Leach Residues by Ammoniacal Thiosulphate Leaching", Paper presented at the 108.sup.th AIME Annual Meeting, New Orleans, Louisiana, Feb. 18-22, 1979, pp. 1-18.
Bhaduri, "Lixiviation of Refractory Ores with Diethylamine or Ammonium Thiosulfate", A thesis submitted in partial fulfillment of the requirements for the degree of Master of Science in Metallurgical Engineering, Aug. 1987, University of Nevada, Reno, 98 pages.
Bhakta, P., "Ammonium Thiosulfate Heap Leaching" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 259-267.
Bhakta, P., "Measurement and Application of Bioxidation Kinetics for Heaps" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 269-273.
Bhappu, R B, "Status of Non-Cyanide Heap Leaching and Other Cyanide Substitutes", Session Papers: American Mining Congress, Apr. 24-28, 1988, Chicago, vol. 1, pp. 275-287.
Black et al., "Towards An Understanding of Copper (I) Speciation and Reactivity in the Copper-Ammonia-Thiosulfate Lixiviant System", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 183-194.
Block-Bolten et al., "Gold and Silver Extraction from Complex Sulfide Wastes", Recycle and Secondary Recovery of Metals: Proceedings of the Int'l. Symposium on Recycle and Secondary Recovery of Metals and the Fall Extractive and Process Metallurgy Meeting: 1985, pp. 715-726.
Block-Bolten et al., "New Possibilities in the Extraction of Gold and Silver from Zinc and Lead Sulfide Flotation Wastes", TMS-AIME Fall Extractive Meeting, 1985, held in San Diego, CA, pp. 149-166.
Block-Bolten et al., "Thiosulfate Leaching of Gold from Sulfide Wastes", Metall. 40, Hahrgang, Heft 7, Jul. 1986, pp. 687-689.
Bouffard et al., "Mathematical Modeling of Pyritic Refractory Gold Ore Heap Biooxidation: Model Development and Isothermal Column Simulations", Hydrometallurgy 2003—Fifth International Conference in Honor of Professor Ian Ritchie—vol. 1: Leaching and Solution Purification, Edited by C.A. Young, A.M. Alfantazi, C.G.

(56) References Cited

OTHER PUBLICATIONS

Anderson, D.B. Dreisinger, B. Harris and a. James TMS (The Minerals, Metals & Materials Society), 2003, pp. 275-288.

Bourge, "Thiosulfate may replace cyanide in leaching", American Metal Market, 107(40) Mar. 2, 1999, 1 page.

Breuer et al. "A Review of the Chemistry, Electrochemistry And Kinetics of the Gold Thiosulfate Leaching Process" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 139-154.

Breuer et al., "An Electrochemical Study of Gold Oxidation in Solutions Containing Thiosulfate, Ammonia and Copper", Electrochemistry in Mineral and Metal Processing V, The Electrochemical Society, 2000, pp. 195-205.

Breuer et al., "Thiosulfate Leaching Kinetics of Gold in the Presence of Copper and Ammonia", Minerals Engineering, vol. 15, No. 10-11, 2000 Present at Hydromet 100, Adelaide, Australia, Apr. 2000, pp. 1071-1081.

Breuer et al., Fundamental Aspects of the Gold Thiosulfate leaching Process, to be presented at TMS Meeting, Feb. 2001, 16 pages.

Briones et al., "The Leaching of Silver Sulfide with the Thiosulfate—Ammonia—Cupric Ion System", Hydrometallurgy 20, 1998, pp. 243-260.

Brown et al., "Alternative Copper (II) Catalysts For Gold Leaching: Use of Multidentate Ligands To Control THiosulfate Oxidation" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 213-226.

Byerley et al., "Activation of Copper (II) Ammine Complexes by Molecular Oxygen for the Oxidation of Thiosulfate Ions", journal of Chemical Society: Dalton transactions, 1975, pp. 1329-1338.

Byerley et al., "Kinetics and Mechanism of the Oxidation of Thiosulphate Ions by Copper—(II) Ions in Aqueous Ammonia Solution." Journal of the Chemical Society, Dalton Transactions, 1973, Issue 8, pp. 889-8934.

Byerley et al., "The Oxidation of Thiosulfate in Aqueous Ammonia by Copper (II) Oxygen Complexes", Inorg. Nucl. Chem. Letters, vol. 9, 1973, pp. 879-883.

Caney, D.J., "Thiosulfate shows leach promise—U.S. government study shows costs about the same as cyanide," American Metal Market, vol. 102, No. 196 (Oct. 11, 1994), 1 page.

Chanda et al., "Ion-Exchange Sorption of Thiosulfate and Tetrathionate on Protonated Poly (4-Vinyl Pyridine)", Reactive Polymers, 2, 1984, pp. 269-278.

Chandra et al., "Can A Thiosulfate Leaching Process Be Developed Which Does Not Require Copper and Ammonia", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 169-182.

Changlin et al., "Leaching Gold by Low Concentration Thiosulfate Solution", Published in Transactions of NFsoc, vol. 2, No. 4, Nov. 1992, pp. 21-25.

Chen et al., "Electrochemistry of Gold Leaching with Thiosulfate (I) Behaviour and Mechanism of Anodic Dissolution of Gold", J. Cent. South Inst. Min. Metall. vol. 24, No. 1, Apr. 1993 (Published in Chinese), pp. 169-173.

Coetzee et al. "Counter-current vs co-current flow in carbon-in-pulp adsorption circuits," Minerals Engineering, Apr. 1999, vol. 12, No. 4, pp. 415-422.

Cosano, J.S. et al., "Methods for Online Monitoring to be Implemented in an Ammonium Thiosulfate Production Plant," Analytica Chimica Acta, vol. 308, No. 1-3 (1995), pp. 187-196.

Costa, Hydrometallurgy of Gold: New Perspectives and Treatment of Refractory Sulphide Ores, Fizykochemiczne Problemy Mineralurgii, 1997, vol. 31, pp. 63-72.

Danehy, James P. et al., "Iodometric Method for the Determination of Dithionite, Bisulfite, and Thiosulfate in the Presence of Each Other and Its Use in Following the Decomposition of Aqueous Solutions of Sodium Dithionite," Analytical Chemistry, vol. 46, No. 3 (1974), pp. 391-395.

Das, Tomi Nath et al., "Reduction Potentials of $SO3.Bul-$, $SO5.Bul.-$, and $S4O6.Bul.3$-Radicals in Aqueous Solution," The Journal of Physical Chemistry, vol. 103, No. 18 (1999), pp. 3581-3588.

De Jong et al., "Polythionate Degradation by Tetrathionate Hydrolase of Thiobacillus Ferrooxidans", Mirobiology (1997), 143, pp. 499-504.

Deschenes et al., "Cyanidation of a pyrrhotite-bearing old ore," European J. Mineral Processing & Environmental Protection, 2003, vol. 3(3), pp. 353-361.

Dhawale, "Thiosulfate—An Interesting Sulfur Oxoanion That Is Useful in Both Medicine and Industry—But Is Implicated in Corrision", Journal of Chemical Education, vol. 70, No. 1, Jan. 1993, pp. 12-14.

Dixon, D., "Heap Leach Modeling—The Current State of the Art", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 289-314.

Ege, Guenes N. et al., "PVP—A Practical Stabilizer for Technetium-99M-Sulfur Colloid," Journal of Nuclear Medicine, vol. 11, No. 4 (1970), pp. 175-176.

Feng et al., "Elution of Ion Exchange Resins by Use of Ultrasonication", Hydrometallurgy, 55 (2000), pp. 201-212.

Feng, D. et al., "Galvanic Interactions Between Sulphides and Manganese Dioxide in Thiosulphate Leaching of Gold Ores," Department of Chemical Engineering. The University of Melbourne, Victoria, 2001, pp. 1-39.

Feng et al., "The Role of Oxygen in Thiosulphate Leaching of Gold," Hydrometallurgy, 2007, vol. 85, pp. 193-202.

Ferron et al., "Thiosulphate Leaching of Gold and Silver Ores: An Old Process Revisited", Presented at 100.sup.th CIM Annual General Meeting, held in Montreal, Quebec, Canada May 3-7, 1998, 63 pages.

Ficeriova et al., "Thiosulfate leaching of gold from a mechanically activated CuPbZn concentrate," Hydrometallurgy, 2002, vol. 57(1-3), pp. 37-43.

Fleming et al., "Recent Advances in the Development of an Alternative to the Cyanidation Process—Based on Thiosulphate Leaching and Resin In Pulp", Paper presented at Ballarat, Nov. 2000, 27 pages.

Flett et al., "Chemical Study of Thiosulphate Leaching of Silver Sulphide", Trans. Instn. Min. Metall. 92, Dec. 1983, pp. C216-C223.

Foss et al., "Displacement of Sulphite Groups of Polythionates by Thiosulphate", Acta Chem. Scand. 15, 1961 No. 1, pp. 1608-1611.

Gadalla Ahmed M. et al., "Characterization of the Product of the Thiosulfate Process for Desulfurization of Flue Gases," Industrial & Engineering Chemistry Research, vol. 33, No. 5 (1994), pp. 1145-1149.

Gallagher et al., "Affinity of Activated Carbon Towards Some Gold (I) Complexes", Hydrometallurgy, 15, 1990, pp. 305-316.

Gallagher, "Interaction of Gold Cyanide, Thiocyanate, Thiosulfate, and Thiourea Complexes with Carbon Matrices", A thesis submitted in partial fulfillment of the requirements for the degree of Master of Science in Metallurgical Engineering, May 1987, University of Nevada, Reno, 194 pages.

Gelves et al., "Recovering of Refractory Gold Using Ammonium Thiosulfate Solutions", Clean Technology for the Mining Industry, Proceeding of the III International Conference on Clean Technologies for the Mining Industry held in Santiago, Chile, May 15-17, 1996, pp. 477-487.

Goldhaber, "Experimental Study of Metastable Sulfur Oxyanion Formation During Pyrite Oxidation at pH 6-9 and 30.degree. C", American Journal of Science, vol. 283, Mar. 1983, pp. 193-217.

(56) References Cited

OTHER PUBLICATIONS

Grosse, et al., "Leaching and recovery of gold using ammoniacal thiosulfate leach liquors (a review)," Hydrometallurgy, Elsevier Scientific Publishing CY, Amsterdam, NL, Apr. 1, 2003, vol. 69(1-3), pp. 1-21, XP004416000, ISSN: 0304-386X, DOI: 10.1016/S0304-386X(02)00169-X * pp. 11-17; table 5, abstract only.

Groudev et al., "Extraction of Gold and Silver from Oxide Ores by Means of a Combined Biological and Chemical Leaching", Biohydrometallurgical Technologies: Proceedings of an International Biohydrometallurgy Symposium, held in Jackson Hole, Wyoming, Aug. 22-25, 1993, pp. 417-425.

Groudev et al., "Pilot Scale Microbial Leaching of Gold and Silver from an Oxide in Eishitza Mine, Bulgaria", Mineral Bioprocessing II: Proceedings of the Engineering Foundation Conference Minerals Processing II, held in Snowbird, Utah, Jul. 10-15, 1995, pp. 35-144.

Groudev et al., "Two-Stage Microbial Leaching of a Refractory Gold-Bearing Pyrite Ore", Minerals Engineering, vol. 9, No. 7, 1996, pp. 707-713.

Groudev, et al., "A Combined Chemical and Biological Heap Leaching of an Oxide Gold-Bearing Ore", Physicochemical Problems of Mineral Processing, 33, pp. 55-61 1999.

Guerra et al., "A Study of the Factors Affecting copper Cementation of Gold from Ammoniacal Thiosulphate Solution", Hydrometallurgy 51 (1999), pp. 155-172.

Guerra, "A Study of the Factors Affecting Copper Cementation of Gold from Ammoniacal Thiosulphate Solution", A Thesis submitted in partial fulfillment of the requirements for the Degree of Master of Applied Science in the faculty of graduate studies, Nov. 1997, pp. 1-74.

Gundiler et al., "Thiosulphate leaching of Gold from Copper-Bearing Ores", Presented at the SME annual Meeting held in Reno, Nevada, Feb. 15-18, 1993, 13 pages.

Han et al., "Factors Influencing the Rate of Dissolution of Gold in Ammoniacal Solutions", Int. J. Miner. Process. 58, 2000, pp. 369-381.

Hemmati et al., "Study of the Thiosulphate Leaching of Gold from Carbonaceous Ore and the Quantitative Determination of Thiosulphate in the Leached Solutions", Papers presented at the Extraction'89 symposium, organized by The Institution of Mining and Metallurgy and held in London, from Jul. 10-13, 1989, pp. 665-678.

Hemmati, "A Study of the Thiosulfate Leaching of Gold from Carbonaceous Ore and the Quantitative Determination of Thiosulfate in the Leached Solution", A thesis submitted in partial fulfillment of the requirements for the degree of Master of Science in Metallurgical Engineering, Apr. 1987, University of Nevada, Reno, 19 pages.

Hiskey, J. Brent et al., "Dissolution Chemistry of Gold and Silver in Different Lixiviants," Mineral Processing and Extractive Metallurgy Review, vol. 4, Dec. 1988, pp. 95-134.

Hitchen et al., "A Review of Analytical Methods for the Determination of Polythionates, Thiosulphate, Sulphite and Sulphide in Mining Effluents", Report dated Aug. 1976, pp. 1-23.

Hitchen, "Preparation of Potassium Tetrathionate and Potassium Trithionate for Studies of the Thiosalt Problem in Mining Effluents", Report dated Oct. 1976, pp. 1-5.

Huang et 35., "Theory and Practice of Leaching Gold by Thiosulfate", South Inst of Metallurgy PRC, vol. 19(9):1998, pp. 34-36.

Idriss et al., "A New Method for the Macro-and Microdetermination of Tri-and Tetrathionate", Can. J. Chem., col. 55, 1977, pp. 3887-3893.

Jacobson, R.H. et al., "Gold Solution Mining," Proceedings of a Symposium on Precious and Rare Metals, Albuquerque, NM, Apr. 6/8, 1988, pp. 157-174.

Jagushte et al., "Insight Into Spent Caustic Treatment: On Wet Oxidation of Thiosulfte to Sulfate" J. Chem Technol. Biotechnol, 74 (1999), pp. 437-444.

Jeffrey et al., "Ion exchange adsorption and elution for recovering gold thosulfate from leach solutions," Hydrometallurgy, 2010, vol. 100(3-4), pp. 136-143.

Jeffrey et al., "The quantification of thiosulfate and polythionates in gold leach solutions and on anion exhange resins," Hydrometallurgy, 2007, vol. 89(1-2), pp. 52-60.

Ji et al., "A Novel THiosulfate System for Leaching Gold Without The Use of Copper and Ammonium", Hydrometallurgy 2003—Fifth International Conference in Honor of Professor Ian Ritchie - vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 227-244.

Ji et al., Research and Optimization of Thiosulfate leaching Techology of Gold, published in Rare Metals (A Chinese Journal of Science, Technology & Applications in the Field of Rare Metals), vol. 10, No. 4, Oct. 1991, pp. 275-280.

Jia, Xueshun et al., "Reductive Cleavage of S—S Bond by Samarium Diiodide: A Novel Method for the Synthesis of Disulfides," Synthetic Communications, vol. 24, No. 20 (1994), pp. 2893-2898.

Jian et al., "Leaching Gold and Silver by Lime-Sulphur-Synthetic-Solution (LSSS)", Xian Inst. Metall. Constr. Eng., vol. 16, 1992, pp. 389-393.

Jiang et al., "A Kinetic Study of Gold Leaching with Thiosulfate", Hydrometallurgy, Fundamentals, Technology and Innovations, AIME, Chapter 7, 1993, pp. 119-126.

Jiang et al., "Anodic Oxidation of Thiosulfate Ions in Gold Leaching", J. Cent. South Univ. Technol., vol. 4, No. 2, Nov. 1997, pp. 89-91.

Jiang et al., "Electrochemistry and Mechanism of Leaching Gold with Ammoniacal Thiosulphate", The Australasian Institute of Mining and Metallurgy Publication Series No. 3/93, vol. 5 Gold Processing, Hydrometallurgy and Dewatering and Miscellaneous, pp. 1141-1146 1993.

Jiang et al., "Gold and Silver Extraction by Ammoniacal Thiosulfate Catalytical Leaching at Ambient Temperature", Proceedings of the first International Conferences on Modern Process Mineralogy and Mineral Processing held in Beijing, China, Sep. 22-25, 1992, pp. 648-653.

Jiang et al., "Regularities of Thiosulfate Consumption and Leaching of Copper-Bearing Gold Ore", Mining and Metallurgical Engineering, vol. 16, No. 1, Mar. 1996, pp. 46-48.

Jiexue et al., "Recovery of Gold from Thiosulfate Solution", Engineering Chemistry and Metallurgy, vol. 10, No. 2, May 1989, pp. 45-50.

Jiexue et al., "Substitution of Sulfite with Sulfate in the Process of Extracting Gold by Thiosulfate Solution", Engineering Chemistry & Metallurgy, vol. 12, No. 4, Nov. 1991, pp. 302-305.

Johnson, et al., "Chemical Mining—A Study of Leaching Agents" New Mexico Bureau of Mines and Mineral Resources (1969), pp. 1-10.

Johnston et al., "Rates of Sulfur Production in Acid Thiosulfate Solutions Using Sulfur-35," Journal of Colloid and Interface Science, vol. 42, No. 1 (1973), pp. 112-119.

Kametani, Hiroshi et al.; "Separation and Identification of Sulfate," Journal of Mining and Metallurgical, vol. 103 (1987), pp. 799-804.

Kelly; "Oxidation of Thiosulphate During Chromatography in the Presence of Copper of Gold Ions"; Journal of Chromatography; col. 66,(1)J., 1972; pp. 185-188.

Kim et al., "Extraction of Gold from a Gold Ore by Ammonium Thiosulphate Leaching", J of the Korean Inst. Of Metals, vol. 28, No. 12 (1990), pp. 1048-1053.

Koh et al., "Spectrophotometric Determination of Total Amounts of Polythionates (tetra-, Penta-, and Hexathionate) in Mixtures with Thiosulfate and Sulfite", Analytical Chemistry, vol. 45, Oct. 12, 1973, pp. 2018-2022.

Koh, et al.; "The Determination of Micro Amounts of Polythionates," Anal. Chin. Acta, vol. 61, Dec. 1972, pp. 451-460.

Kononova et al., "Sorption Recoveryj of Gold from Thiosulphate Solutions After Leaching of Products of Chemical Preparation of Hard Concentrates", Hydrometallurgy vol. 59, Jan. 2001, pp. 115-123.

Kravetz, "Cyanide Destruction Using Catalyzed Thiosulfates," Cherokee Chemical Engineering Company, Inc., 2000, 4 pages.

(56) References Cited

OTHER PUBLICATIONS

Kucha et al., Gold-Pyrite Association-Results of Oxysulphide and Polysulphide Transport of Gold, Trans. Instn. Min. Metall. (Sect. B: Appl. Earth Sci.) 103, Sep.-Dec. 1994.

Lam et al., "The Importance of the CU (II) Catalyst in The THiosulfate Leaching of Gold" Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 195-211.

Lan et al., "Recovery of Gold by Thiosulfate and LSSS", Proceedings of the twenty-first International Precious Metals Conference held in San Francisco, California, 1997, p. 185.

Langhans et al., "Copper-Catalyzed Thiosulfate Leaching of Low-Grade Gold Ores", Hydrometallurgy, 29, 1992, pp. 191-203.

Langhans et al., "Gold Extraction from Low Grade Carbonaceous Ore Using Thiosulfate", Practical Aspects of International Management and Processing, SME, 1996, pp. 85-94.

Levenson et al., "The Stability of Concentrated Thiosulphate solutions at High Temperature. Part II. The Loss of the Sulphite", The Journal of Photographic Science, vol. 13, 1965, pp. 79-81.

Li et al., "Copper Catalyzed Ammoniacal Thiosulfate Leaching of Gold and Silver—Solution Chemistry", 1995, 34 pages.

Li et al., "Important Solution Chemistry Factors That Influence the Copper-Catalyzed Ammonium Thiosulfate Leaching of Gold", Presented at the 125.sup.th SME Annual Meeting held in Pheonix, Arizona, Mar. 11-14, 1996, pp. 1-20.

Ll et al., "Leaching Gold with Thiosulphate Solution Containing Added Sodium Chloride and Sodium Dodecyl Sulphonate" Engineering Chemistry & Metallurgy, vol. 19, No. 1, Feb. 1998, pp. 76-82.

Li et al., "Studies on a United Non-Toxic Process to Recover Au/Cu from Complex Gold Ores Bearing Copper", Journal of Xiangtan Mining Institute, vol. 14, No. 2, 1999, pp. 50-54.

Li et al., "The Ammoniacal Thiosulfate System for Precious Metal Recovery", Published in the Proceedings of the XIX International Mineral Processing Congress, Precious Metals Processing and Mineral Waste and the Environment, vol. 4, 1995, Chapter 7, pp. 37-42.

Lukomskaya, "Extraction of Copper Gold and Silver from Tailings by Thiosulfate Heap Leaching.", Tsvetnye Metally, No. 4, Apr. 4, 1999, p. 48-49.

Makhija et al., "Determination of Polythionates and Thiosulphate in Mining Effluents and Mill Circuit Solutions", Talanta, vol. 25, 1978, pp. 79-84.

Makhija et al., "The Titrimetric Determination of Sulphate, Thiosulphate and Polythionates in Mining Effluents", Report dated Feb. 1978, pp. 1-14.

Makhija, "The Determination of Polythionates and Thiosulphate in Mining Effluents and Mill Circuit Samples," Mineral Sciences Laboratories Report MRP/MSL 76-361 (TR) (Dec. 1976), pp. 1-9.

Marcus, "The Anion Exchange of Metal Complexes—The Silver-Thiosulphate System", Published in the ACTA Chemica Scandinavica 11 (1957), pp. 619-627.

McPartland et al., "Concentration and Reduction of Au(I) Thiosulfate to Metallic Gold", Metal Separation Technologies Beyond 2000: Integrating Novel Chemistry with Processing, ed. By K.C. Liddell and D.J. Chaiko, TMS, 1999, pp. 105-115.

McPartland et al., "Leaching of precious Metal Ores Using Thiosulfate", Metal Separation Technologies Beyond 2000: Integrating Novel Chemistry with Processing, ed. By K.C. Liddell and D.J. Chaiko, TMS, 1999, pp. 93-103.

Meyer et al., "Raman Spectrometric Study of the Thermal Decomposition of Aqueous Tri- and Tetrathionate", Phosphorus and Sulfur, vol. 14, 1982, pp. 23-36.

Michel et al., "Integration of Amino Acids in the Thiosulfate Gold Leaching Process", Randol Gld & Silver Forum, 1999, pp. 99-103.

Michel, Didier et al., "Electrochemical Investigation of the Thiosulfate Gold Leaching Process," presented at CIM Gold Symposium, Montreal 98, May 1998, 12 pages.

Mizoguchi et al., "The Chemical Behavior of Low Valence Sulfur Compounds.X. . sup.1) Disproportionation of Thiosulfate, Trithionate, Tetrathionate and Sulfite Under Acidic Conditions", Bulletin of the Chemical Society of Japan, vol. 49(1), 1976, pp. 70-75.

Molleman, et al., "The Treatment of Copper-Gold Ores by Ammonium Thiosulfate Leaching", Hydrometallurgy, Elsevier Science, vol. 66 No. 1-3, Oct. 2002, pp. 1-21.

Murthy et al., "Leaching of Gold and Silver from Miller Process Dross Through Non-Cyanide Leachants", Hydrometallurgy 42, 1996, pp. 27-33.

Murthy, "Some Studies on the Extraction of Gold and Silver from Lead-Zinc Sulphide Flotation Tailings through Non-Cyanide Leachants", Trans. Indian inst. Met. vol. 44, No. 5, Oct. 1991, pp. 349-354.

Naito et al., "The Chemical Behavior of Low Valence Sulfur Compounds. III. Production of Ammonium Sulfamate by the Oxidation of Ammonium Thiosulfate", Bulletin of the Chemical Society of Japan, vol. 43, 1970, pp. 1365-1372.

Naito et al., "The Chemical Behavior of Low Valence Sulfur Compounds. V. Decomposition and Oxidation of Terathionate in Aqueous Ammonia Solution", Bulletin of the Chemical Society of Japan, vol. 43, 1970, pp. 1372-1376.

Naito et al., "The Reactions of Polythionates Kinetics of the Cleavage of Trithionate Ion in Aqueous Solutions", J. inorg. Nucl. Chem., vol. 37, 1975, pp. 1453-1457.

Nicol et al., "Recovery Of Gold From Thiosulfate Solutions And Pulps With Ion-Exchange Resins", presented at TMS Annual Meeting, New Orleans, LA Feb. 11-15, 2001.

Niinae et al., "Preferential Leaching of Cobalt, Nickel and Copper from Cobalt-rich Feromanganese Crusts with Ammoniacal Solutions using Ammonium Thiosulfate and Ammonium Sulfite as Reducing Agent", Hydrometallurgy, vol. 40, 1996, pp. 111-121.

No Author, "And So Does a Novel Lixiviant", Chemical Engineering, vol. 102(3), Mar. 1995, p. 25.

No Author, "Gold Extraction Method Offers Companies an Alternative to Cyanide", JOM: The Journal of the Minerals, Metals & Materials Society, vol. 46(11), Nov. 1994, p. 4.

Nord et al., "The Oxidation of Thiosulfate by the Tetramminegold (III) ion in Aqueous Solution", Acta Chemica Scandinavica A 29, 1975, pp. 505-512.

Ofori-Sarpong et al., "Myco-hydrometallurgy: coal model for potential reduction of preg-robbing capacity of carbonaceous gold ores using the fungus, Phanerochaete chrysosporium," Hydrometallurgy, 2010, vol. 102, pp. 66-72, abstract only.

Olvera et al., "Effect of activated carbon on the thiosulfate leaching of gold," AuTec Innovative Extractive Solutions Ltd, Paper, date unknown, 16 pages.

Olvera, Report, Catalyzed thiosulfate leaching of gold from oxide ores, AuTec, Doc. # R2019-005, Jan. 2019, pp. 1-7.

O'Malley, "Recovery of Gold from Thiosulfate Solutions and Pulps with Anion-Exchange Resins," PhD thesis, Murdoch University, 2002, 284 pages.

Osaka et al., Electrodeposition of Soft Gold from a Thiosulfate-Sulfite Bath for Electronics Appications, J. Electrochem. Soc., vol. 144, No. 10, Oct. 1997, pp. 3462-3469.

Panayotov, "A Technology for Thiosulphate Leaching of Au and Ag from Pyrite Concentrates", Changing Scopes in Mineral Processing: proceedings of the 6.sup.th International Mineral Processing Symposium, Kusadasi, Turkey, Sep. 24-26, 1996, pp. 563-565.

Pedraza et al., "Electro-Oxidation of Thiosulphate Ion on Gold-study by means of Cyclic Voltammetry and Auger Electron Spectroscopy", J. Electroanal. Chem., 250, 1988, pp. 443-449.

O'Malley et al., "Recovery of Gold from Thiosulfate Solutions and Pulps with Anion-Exchange Resins," This Thesis is Presented for the Degree of Doctor of Philosophy in Extractive Metallurgy, Jan. 1, 2002 (Jan. 1, 2002), XP055305007, Retrieved from the Internet: URL:http://researchrepository.murdoch.edu. au/3355/1/O'Malley_2002.pdf * p. 46-p. 86 *.

Pyke et al., "The Characterisation and Behaviour of Carbonaceous Material in a Refractory Gold Bearing Ore," 1999, vol. 99, pp. 851-862.

(56) References Cited

OTHER PUBLICATIONS

Qian et al., "Kinetics of Gold Leaching from Sulfide Gold Concentrates with Thiosulfate Solution", Transaction of Nfsoc vol. 3, No. 4, Nov. 1993, pp. 30-36.
Qian et al., "Treatment of sulphide Gold Concentrate Containing Copper with Thiosulfate Solution" (published in Chinese), Engineering Chemist, vol. Iss, 11,May 2, 1990, pp. 145-151.
Qian et al., "Treatment of Sulphide Gold Concentrate Containing Copper with Thiosulfate Solution", Proceedings of Randol Gold Conference, Sacramento 1989, pp. 131-135.
Rolia et al., "Oxidation of Thiosalts with Hydrogen Peroxide", Report dated May 1984, pp. 1-26.
Rolla et al., "The Kinetics of Decomposition of Tetrathionate, Trithionate and Thiosulphate in Alkaline Media", Report dated Mar. 1981, pp. 1-34.
Rolia et al., The Oxidation of Thiosulphate by Hydrogen Peroxide in Alkaline Solution, Report dated Jul. 1984, pp. 1-14.
Rolia, et al., "Effect of pH and Retention Time on the Degradation of Thiosalts," CANMET Mineral Sciences Laboratories Report MRP/MSL 79-8 (TR) (Jan. 1979), pp. 1-16.
Rolia, et al., "Oxidation of Thiosalts by S02 Plus Air, Charcoal Plus Air, and Chlorine," CANMET Mineral Sciences Laboratories Report MRP/MSL 79-85 (TR) (Jun. 1979), pp. 8-12.
Rolia, "Kinetics of Decomposition of Tetrathionate, Trithionate and Thiosulfate in Alkaline Media" Environ. Sci. Technol. 1982, 16, pp. 852-857.
Rolia, "The Kinetics of Decomposition of Tetrathionate, Trithionate and Thiosulphate in Alkaline Solution", A Thesis submitted to the School of Graduate Studies in partial fulfillment of the requirements for the Degree of Master of Science Carleton University, Sep. 1981, pp. 1-170.
Rolia, "The Kinetics of Decomposition of Thiosalts by Metallic Iron", Report dated Jun. 1981, pp. 1-19.
Rolia; "The Oxidation of Thiosalts in Strongly Alkaline Media"; Report dated Nov. 1981; p. 28.
Rong Yu Wan et al., "Research and Development Activities for the Recovery of Gold from Noncyanide Solutions," Hydrometallurgy Fundamentals, Technology and Innovation (J.B. Hisky & G.W. Warren, Eds. 1993) pp. 415-436.
Axel Schippers et al., "Bacterial Leaching of Metal Sulfides Proceeds by Two Indirect Mechanisms via Thiosulfate or via Polysulfides and Sulfur," Applied and Environmental Microbiology (Jan. 1999) pp. 319-321.
Schmitz, P. A., "Ammoniacal thiosulfate and sodium cyanide leaching of preg-robbing Goldstrike ore carbonaceous matter," Elsevier, Hydrometallurygy 60 (2001) pp. 25-40, 2001.
Senanayake et al., Thermodynamic Studies Of The Gold (III) (I)/(0) Redox System In Ammonia-Thiosulphate Solutions at 25° C., Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 155-168.
Sitando, "Gold Leaching in Thiosulfate-Oxygen Solutions," Thesis presented for the degree of Doctor of Philosophy in Extractive Metallurgy, Murdoch University, Perth, published 2017.
Siu et al., "Kinetics of Reaction of Sulfide with Thiosulfate in Aqueous Solution", Ind. Eng. Chem. Res., 1999, 38, pp. 1306-1309.
Smith et al., "Aqueous Solution Chemistry of Polythionates and Thiosulphate: A Review of Formation and Degradation Pathways", Mineral Sciences Laboratories Report MRP/MSL 76-223 (LS), Canmet, Aug. 1976, pp. 1-29.
Steudel et al., "The Molecular Nature of the Hydrophilic Sulfur Prepared from Aqueous Sulfide and Sulfite (Selmi Sulfur Sol)", Z. Naturforsch. Bc, 1989, 44:4, pp. 526-530.
Steudel et al., "The Moledular Composition of Hydrophilic Sulfur Sols Prepared by Acid Decomposition of Thiosulfate," Zeitschrift Fur Naturforschung, vol. 43, No. 2 (1988), pp. 203-218.

Subramanian et al. (1980) 'Reverse Osmosis Separation of Thiosalts from Mining Effluents', Separation Science and Technology, 15: 5, 1205-1211.
Sullivan et al., "The Autocatalytic Deposition of Gold in Nonalkaline, Gold Thiosulfate Electroless Batch", J. Electrochem. Soc., vol. 142, No. 7, Jul. 1995, pp. 2250-2255.
Ter-Arakelyan et al., "Technological Expediency of Sodium Thiosulphate for the Extraction of Gold from Ores", Soviety Non-Ferrous Metals Research, vol. 12, No. 5, 1984, pp. 393-397.
Tozawa et al., "Dissolution of Gold in Ammoniacal Thiosulfate Solution", Metallurgical Society AIME, 1981, pp. 1-12 and cover.
Tykodi, "In Praise of Thiosulfate", Journal of Chemical Education, 1990, vol. 68, pp. 146-149.
Umetsu et al., "Dissolution of Gold in Ammoniacal Sodium Thiosulfate Solution", AIME World Lead-Zinc Symposium, vol. II, 1970, pp. 97-104.
Vandeputte et al., "Influence of the Sodium Nitrate Content on the Rate of the Electrodeposition of Silver from Thiosulphate Solutions", Electrochimica Acta. vol. 42, Nos. 23-24, 1997, pp. 3429-3441.
Von Michaelis et al., "The Prospects for Alternative Leach Reagents—Can Precious metals Producers Get Along With Cyanide?", Engineering and Mining Journal, Jun. 1987, pp. 42-47.
Wan et al., "Thiosulfate Leaching Following Biooxidation Pretreatment for Gold Recovery from Refractory Carbonaceous-Sulfidic Ore", Mining Engineering, Aug. 1997, pp. 76-80.
Wan R.Y. et al., "Solution Chemistry Factors For Gold Thiosulfate Heap Leaching," International Jounral of Mineral Processing, (Jul. 1, 2003), pp. 311-322.
Wan, "Importance of Solution Chemistry for Thiosulphate Leaching of Gold", Presented at the World Gold '97 Conference in Singapore, Sep. 1-3, 1997, pp. 159-162.
Wang et al., "A Novel Gold Electroplating System: Gold (I)-Iodide-Thiosulfate", J. Electrochem. Soc., vol. 145, No. 3, Mar. 1998.
Wang, "Thermodynamic Equilibrium Calculations on Au/Ag-Lixiviant Systems Relevant to Gold Extraction from complex Ores", Proceedings of the Third International Symposium on Electrochemistry in Mineral and Metal Processing III, 1992, pp. 452-477.
Webster, "Thiosulphate Complexing in Gold and Silver During the Oxidation of a Sulphide-Bearing Carbonate Lode System, Upper Ridges Mine, P.N.G.", The Aus. I.M.M. Perth and Kaigoorlie Branches, Region conference on Gold-Mining Metallurgy and Geology, Oct. 1984, pp. 437-445.
Wenge et al., "Studies on Leaching Gold and Silver from Gold Concentrates and Silver Pyrites Associated with Complex Metals Sulphides by Ammoniacal Thiosulfate" (published in Chinese), Non Ferrous Metals, vol. 39, No. 4, Nov. 1987, pp. 71-76.
Wentzien et al., "Thiosulfate and Tetrathionate Degradation as well as Biofilm Generation by Thiobacillus Intermedius and Thiobacillus Versutus Studied by Microcalorimetry, HPLC, and Ion-pair Chromatography", Arch Microbiol. 161, 1994, pp. 116-125.
West-Sells et al., "A Process For Counteracting the Detrimental Effect Of Tetrathionate On Resin Gold Adsorption From Thiosulfate Leachates", Hydrometallurgy 2003—Fifth International Conference in Honor of Professor Ian Ritchie—vol. 1: Leaching and Solution Purification, Edited by C.A. Young, A.M. Alfantazi, C.G. Anderson, D.B. Dreisinger, B. Harris and a. James TMS (The Minerals, Metals & Materials Society), 2003, pp. 245-256.
Xu et al., "Review of Thiosulfate Leaching of Gold: Focus on Thiosulfate Consumption and Gold Recovery from Pregnant Solution," Metals, Jun. 15, 2017, vol. 7, 222, 16 pages.
Yang et al., "Leaching Gold from Refractory Gold Ore Bearing Arsenic by Thiosulfate Process", Journal of Yunnan University, 19:5, 1997, pp. 508-514.
Yang, Ming et al., "Application of Catalytic Oxidation to PR," Guangxi Chemical Industry, vol. 28 (1999), pp. 18-19, 25.
Yen et al., "Development in Percolation Leaching with Ammonium Thiosulfate for Gold Extraction of a Mild Refractory Ore", EPD Congress 1999, The Minerals & Materials Society, 1999, Paper at the TMS, Mar. 1-3, 1999, held in San Diego, California, pp. 441-455.

(56) References Cited

OTHER PUBLICATIONS

Yen et al., "Gold Extraction from Mildly Refractory Ore Using Ammonium Thiosulphate", International Symposium of Gold Recovery, May 4-7, 1998, Montreal, Quebec, Canada.
Yokosuka et al., "Chemical Behaviour of Low-Valent Sulfur Compounds XII Oxidation of Sodium Thiosulfate with Hydrogen Peroxide and Sodium Hypochlorite", Journal of the Japan Chemistry Society, 11, 1975, pp. 1901-1909.
Zhang "Oxidation of Refractory gold Concentrates and Simultaneous Dissolution of Gold in Aerated Alkaline Solutions", Thesis, Murdock University, Australia, Mar. 2004, 358 pages.
Zhang et al., "Gold Extraction by Ammoniacal Thiosulfate Leaching from the Roasted Copper-Bearing Sulphureous Gold Concentrate", Huangjin Bianjibu, PRC, vol. 20 (7), 1999, pp. 32-35.
Zhao et al., "Extraction of gold from thiosulfate solutions using amine mixed with neutral donor reagents", Hydrometallurgy 48, 1998, pp. 133-144.
Zhao et al., "Extraction of gold from thiosulfate solutions with alkyl phosphorus esters", Hydrometallurgy 46 (1997) pp. 363-372.
Zhao et al., "Gold Extraction from Thiosulfate Solutions Using Mixed Amines", Solvent Extraction and Ion Exchange, 16(6), 1998, pp. 1407-1420.
Zhu et al., "Electrochemical Studies on the Mechanism of Gold Dissolution in Thiosulfate Solutions", Transactions of NFsoc, vol. 4, No. 1, 1991, pp. 50-53.
Zhu et al., "Oxidation Kinetics of Thiosulfate and Polysulfide Mixture", Engineering Chemistry & Metallurgy, vol. 17, No. 1, 1996, pp. 26-31.
Zhu, Guocal et al.' "Leaching of Gold from Sulfide Concentrates with Thiosulfate/Polysulfide Produced by Disproportionation of Elemental Sulfur in Ammoniacal Media," Papers Presented at the International Symposium Hydrometallurgy '94, pp. 541-546.
Zilberman et al., "Decomposition of polythionates", Russian Journal of Inorganic Chemistry, vol. 14, No. 8, 1969, pp. 1203-1204.
Zipperian et al., "Gold and Silver Extraction by Ammoniacal Thiosulfate Leaching from a Ryolite Ore", Hydrometallurgy, vol. 19, 1988 pp. 361-375.
Australian Patent Office Examiner's First Report on Australian Patent Application No. 18525/99, mailed Sep. 26, 2001, 2 pages.
Canadian Patent Office First Office Action on Canadian Patent Application No. 2,278,044, mailed Sep. 21, 2006, 2 pages.
Official Action for Argentine Patent Application No. P060102243, 1 page.
Translation of Official Action for Argentine Patent Application No. P060102244, 1 page.
Official Action with mechanical English translation for Chile Patent Application No. 1163/2001, dated Feb. 13, 2012, 6 pages.
Official Action for Chile Patent Application No. 2014-001620, dated Feb. 6, 2017 7 pages No translation.
Search Report for International (PCT) Patent Application No. PCT/IB01/01119, mailed Jul. 2, 2002, 8 pages.
Written Opinion for International (PCT) Patent Application No. PCT/IB01/01119, mailed Nov. 6, 2002, 2 pages.
International Preliminary Examination Report for International (PCT) Patent Application No. PCT/IB01/01119, mailed Jan. 10, 2003, 22 pages.
Examiner's First Report for Australian Application No. 2001274393 dated Apr. 18, 2005, 2 pages.
Examiner's Report No. 2 for Australian Application No. 2001274393 dated Mar. 27, 2006), 2 pages.
Examiner's Report No. 3 for Australian Application No. 2001274393 dated Apr. 28, 2006, 2 pages.
Examiner's Report No. 4 for Australian Application No. 2001274393 dated Jul. 25, 2006, 2 pages.
Australian Patent Office Examiner's Report No. 2 on Australian Patent Application No. 2006/200966, mailed Dec. 14, 2006, 2 pages.
Australian Patent Office Examiner's First Report on Australian Patent Application No. 2006/200967, mailed Jul. 4, 2006, 2 pages.
Office Action for Canadian Patent Application No. 2,409,378, mailed Jan. 26, 2007.
Office Action for Canadian Patent Application No. 2,409,378, mailed May 22, 2008.
Notice of Allowance for Canadian Patent Application No. 2,409,378, mailed Aug. 10, 2009.
Office Action for Canadian Patent Application No. 2,620,644, mailed Oct. 14, 2008.
Notice of Allowance for Canadian Patent Application No. 2,620,644, mailed Jul. 14, 2009.
Office Action for Canadian Patent Application No. 2,617,457, mailed Oct. 14, 2008.
Official Action for Canadian Patent Application No. 2,617,457, dated Jul. 9, 2010.
Office Action for Canadian Patent Application No. 2,617,457, mailed Jul. 10, 2009.
Notice of Allowance for Canada Patent Application No. 2,617,457, dated Feb. 18, 2011 1 page.
Office Action for Canadian Patent Application No. 2,617,415, mailed May 28, 2008.
Notice of Allowance for Canadian Patent Application No. 2,617,415, mailed Jul. 14, 2009, 3 pages.
Notice of Allowance for Canada Patent Application No. 2,664,756, dated Mar. 28, 2012 1 page.
Official Action for Canadian Patent Application No. 2,664,756, dated May 14, 2010, 3 pages.
Official Action for Canada Patent Application No. 2664756, dated Feb. 15, 2011, 2 pages.
Official Action for Canadian Patent Application No. 2,698,578, dated Nov. 23, 2010, 3 pages.
Official Action for Canada Patent Application No. 2,698,578, dated Jan. 26, 2012 2 pages.
Official Action for Canadian Patent Application No. 2,698,578, dated Feb. 4, 2013, 2 pages.
Notice of Allowance for Canadian Patent Application No. 2,698,578, dated Nov. 7, 2013, 1 page.
Official Action for Canadian Patent Application No. 2,745,806, dated Nov. 29, 2012, 3 pages.
Official Action for Canadian Patent Application No. 2,745,806, dated Nov. 4, 2013, 2 pages.
Official Action for Canadian Patent Application No. 2,745,806, dated Apr. 30, 2014, 2 pages.
Official Action for Canadian Patent Application No. 2,745,928, dated Nov. 28, 2012, 3 pages.
Notice of Allowance for Canada Patent Application No. 2,745,933, dated Oct. 12, 2011, 1 page.
Official Action for Canada Patent Application No. 2,756,715, dated Apr. 29, 2013, 2 pages.
Notice of Allowance for Canada Patent Application No. 2,756,715, dated Mar. 18, 2014, 1 page.
Office Action for Canada Patent Application No. 2,864,359, dated Dec. 12, 2014, 3 pages.
Office Action for Canada Patent Application No. 2,864,359, dated Oct. 26, 2015, 1 pages.
UK Patent Office Examination Report on UK Patent Application No. 0226199.8, mailed Nov. 12, 2003, 5 pages.
UK Patent Office Further Examination Report on UK Patent Application No. 0226199.8, mailed May 21, 2004, 3 pages.
UK Patent Office Further Examination Report on UK Patent Application No. 0226199.8, mailed Aug. 9, 2004, 3 pages.
UK Patent Office Further Examination Report on UK Patent Application No. 0226199.8, mailed Sep. 21, 2004, 2 pages.
Office Action for Canadian Patent Application No. 2,424,714, mailed Jan. 26, 2009.
Office Action for Canadian Patent Application No. 2,424,714, mailed Sep. 14, 2009, 3 pages.
Notice of Allowance for Canadian Patent Application No. 2,424,714, dated Jul. 8, 2010, 1 page.
Official Action for Argentine Patent Application No. P030104232, date unknown, 1 page.
Translation of Report Previous to Final Decision for Argentine Patent Application No. P030104232, date unknown, 1 page.

(56) References Cited

OTHER PUBLICATIONS

Office Action for Canadian Patent Application No. 2,449,467, mailed Sep. 13, 2007, 3 pages.
Office Action for Canadian Patent Application No. 2,449,467, mailed Jan. 28, 2009, 2 pages.
Notice of Allowance for Canadian Patent Application No. 2,449,467, mailed Sep. 14, 2009, 1 page.
Official Action for Canada Patent Application No. 2,691,607, dated Aug. 8, 2011 3 pages.
Office Action for Canadian Patent Application No. 2,691,607, dated Apr. 4, 2013, 3 pages.
Notice of Allowance for Canadian Patent Application No. 2,691,607, dated Mar. 19, 2014, 1 page.
Office Action for Canadian Patent Application No. 2,850,217, dated Jun. 1, 2016, 4 pages.
Office Action for Canadian Patent Application No. 2,850,216, dated Nov. 14, 2014, 3 pages.
International Search Report for counterpart PCT application PCT/IB 03/06475 dated Jun. 30, 2006, 10 pages.
Written Opinion for counterpart PCT application PCT/IB 03/06475 dated Oct. 19, 2006, 2 pages.
International Preliminary Examination Report for counterpart PCT application PCT/IB 03/06475 dated Dec. 13, 2006, 3 pages.
Substantive Examination Report for ARIPO Patent Application No. AP/P/2005/003335, mailed Aug. 18, 2008, 4 pages.
Examination Report and Form No. 21 for ARIPO Patent Application No. AP/P/2005/003335, mailed Jan. 29, 2009, 4 pages.
Notice of Allowance for African Regional Intellectual Property Organization (ARIPO) Patent Application No. AP/P/2009/004750, dated Jul. 23, 2012 5 pages.
Notice of Acceptance for Australian Patent Application No. 2003302110, mailed Sep. 19, 2007, 1 page.
Examiner's Report for Australian Patent Application No. 2007211912, mailed Dec. 7, 2007.
Notice of Acceptance for Australian Patent Application No. 2007211912, mailed Jan. 16, 2008, 1 page.
Office Action for Canadian Patent Application No. 2,505,740, mailed Jun. 4, 2008, 4 pages.
Office Action for Canadian Patent Application No. 2,505,740, mailed Jul. 16, 2009, 1 page.
Notice of Allowance for Canadian Patent Application No. 2,505,740, dated Apr. 6, 2010.
Official Action for Canada Patent Application No. 2,716,442, dated Jul. 5, 2011 4 pages.
Official Action for Canada Patent Application No. 2,716,442, dated Apr. 3, 2012 3 pages.
Notice of Allowance for Canadian Patent Application No. 2,716,442 dated Feb. 19, 2013, 1 page.
UK Patent Office Examination Report on UK Patent Application No. GB0509741.5, mailed Dec. 22, 2005, 6 pages.
UK Search and Examination Report (GB 0509741.5), dated Apr. 13, 2006, in co-pending related application, 12 pages.
UK Patent Office Examination Report on UK Patent Application No. GB0509741.5, mailed Oct. 4, 2006.
UK Patent Office Combined Search and Examination Report on UK Patent Application No. GB0612107.3, mailed Oct. 4, 2006, 5 pages.
UK Patent Office Combined Search and Examination Report on UK Patent Application No. GB0612108.1, mailed Oct. 4, 2006, 4 pages.
UK Patent Office Search and Examination Report on UK Patent Application No. GB0612108.1, mailed Mar. 5, 2007, 3 pages.
International Search Report and Written Opinion for International (PCT) Patent Application No. PCT/IB2011/003096, malled May 2, 2012 7 pages.
International Preliminary Report on Patentability for International (PCT) Patent Application No. PCT/IB2011/003096, mailed Jun. 20, 2013 5 pages.
Notice of Acceptance for ARIPO Patent Application No. AP/P/2013/006961, dated Sep. 2, 2015 5 pages.
Notice of Acceptance for Australian Patent Application No. 2011340196, dated Nov. 25, 2015, 2 pages.

Official Action for Australian Patent Application No. 2016200323, dated Sep. 15, 2016, 3 pages.
Official Action for Australian Patent Application No. 2016200323, dated May 26, 2017, 4 pages.
Official Action for Australian Patent Application No. 2016200323, dated Jul. 19, 2017, 5 pages.
Notice of Allowance for Australian Patent Application No. 2016200323, dated Aug. 22, 2017, 3 pages.
Official Action for Canada Patent Application No. 2,820,700, dated Oct. 23, 2014, 2 page.
Notice of Allowance for Canada Patent Application No. 2,820,700, dated Mar. 19, 2015 1 page.
Official Action for Canada Patent Application No. 2,863,875, dated Dec. 21, 2016 3 pages.
Official Action for Canada Patent Application No. 2,863,875, dated Sep. 14, 2017 4 pages.
Notice of Allowance for Canada Patent Application No. 2,863,875, dated Jun. 14, 2018, 1 page.
Official Action (with English translation) for Eurasian Patent Application No. 2015 01 143, dated Aug. 16, 2017 4 pages.
Official Action (with English translation) for Eurasian Patent Application No. 2015 01 143, dated Feb. 13, 2018, 4 pages.
Extended Search Report for European Patent Application No. 11846831.3, dated Aug. 14, 2015 5 pages.
Official Action for European Patent Application No. 11846831.3, dated Dec. 22, 2016 3 pages.
Official Action for European Patent Application No. 11846831.3, dated Sep. 19, 2017 3 pages.
Official Action for European Patent Application No. 11846831.3, dated Feb. 7, 2018 3 pages.
Notice of Allowance for European Patent Application No. 11846831.3, dated Aug. 13, 2018, 27 pages.
Notice of Allowance for European Patent Application No. 11846831.3, dated Nov. 11, 2019, 5 pages.
Notice of Allowance for European Patent Application No. 11846831.3, dated Apr. 17, 2020, 2 pages.
Extended European Search Report for Euorpean Patent Application No. 18155275.3, dated May 6, 2018, 7 pages.
Official Action for European Patent Application No. 18155275.3, dated Jun. 3, 2019, 4 pages.
Official Action for European Patent Application No. 18155275.3, dated Apr. 16, 2020, 4 pages.
Official Action for European Patent Application No. 18155275.3, dated Sep. 16, 2020, 4 pages.
Official Action for European Patent Application No. 18155275.3, dated May 20, 2021, 4 pages.
Notice of Allowance for European Patent Application No. 18155275.3, dated Feb. 11, 2022, 7 pages.
Official Action for Indonesia Patent Application No. PP00 2014 04613 dated Jul. 19, 2017, 6 pages.
Office Action (with English summary) for Mexican Patent Application No. MX/a/2013/006124, dated Jul. 28, 2016, 10 pages.
Notice of Acceptance for New Zealand Patent Application No. 611643 dated Jun. 5, 2014, 2 pages.
Official Action for New Zealand Patent Application No. 623104 dated Apr. 7, 2014, 2 pages.
Official Action for Philippines Patent Application No. 1-2013-501134 dated Sep. 3, 2014, 1 page.
Official Action for Philippines Patent Application No. 1-2013-501134 dated Oct. 1, 2014, 1 page.
Official Action for Philippines Patent Application No. 1-2014-502431 dated Aug. 31, 2016, 3 pages.
Official Action for Philippines Patent Application No. 1-2014-502431 dated Jul. 6, 2017, 2 pages.
International Search Report for International Patent Application No. PCT/US12/42615 mailed Aug. 31, 2012, 4 pages.
Written Opinion for International Patent Application No. PCT/US12/42615 mailed Aug. 31, 2012, 4 pages.
International Preliminary Report on Patentability for International Patent Application No. PCT/US12/42615 mailed May 31, 2013, 4 pages.
Official Action (English translation only) for Brazilian Patent Application No. BR112013032149-0, dated May 18, 2018, 7 pages.

(56) References Cited

OTHER PUBLICATIONS

Official Action (English translation only) for Brazilian Patent Application No. BR112013032149-0, dated Sep. 10, 2018, 4 pages.
Official Action (with English translation) for Brazilian Patent Application No. BR112015029585-1, 7 pages.
Official Action for Canadian Patent Application No. 2,838,901, mailed Mar. 11, 2015 4 pages.
Official Action (with English translation) for Dominican Republic Patent Application No. P2013-0303, 38 pages.
Official Action for Eurasian Patent Application No. 201400021, mailed Feb. 3, 2016 4 pages.
Official Action for Eurasian Patent Application No. 201400021, mailed Aug. 31, 2016 4 pages.
Extended European Search Report for European Patent Application No. 12800341.5, mailed May 19, 2015, 7 pages.
Extended European Search Report for European Patent Application No. 17193704.8, mailed Mar. 8, 2018, 7 pages.
Official Action for European Patent Application No. 17193704.8, mailed Mar. 5, 2020, 4 pages.
Official Action (with English translation) for Japanese Patent Application No. 2014-516019, mailed May 24, 2016 5 pages.
Notice of Allowance for Japanese Patent Application No. 2014-516019 mailed Jul. 3, 2018, 3 pages.
International Search Report and Written Opinion for International (PCT) Patent Application No. PCT/IB2014/001378, mailed Oct. 14, 2014 9 pages.
International Preliminary Report on Patentability for International (PCT) Patent Application No. PCT/IB2014/001378, mailed Dec. 10, 2015 7 pages.
Notice of Acceptance for Australian Patent Application No. 2014272803, dated Apr. 6, 2018, 3 pages.
Examiner's Report for Canadian Patent Application No. 2,915,269, mailed Nov. 9, 2018, 3 pages.
Notice of Reallowance for Canada Patent Application No. 2,915,269, dated Jun. 27, 2019 1 page.
Official Action for Eurasian Patent Application No. 201501141, mailed Aug. 11, 2017, 2 pages.
Extended European Search Report for European Patent Application No. 14803553.8, mailed Jan. 31, 2017, 9 pages.
Intent to Grant for European Patent Application No. 14803553.8, mailed Mar. 6, 2018, 27 pages.
Official Action (with English translation) for Japanese Patent Application No. 2016-516258, dated May 29, 2018, 7 pages.
Official Action (with English translation) for Japanese Patent Application No. 2019-079274, dated Jul. 1, 2020, 4 pages.
Official Action (with English translation) for Japanese Patent Application No. 2019-079274, dated Mar. 23, 2021, 7 pages.
Official Action (with English translation) for Japanese Patent Application No. 2019-079274, dated Nov. 2, 2021, 3 pages.
Notice of Allowance (with English translation) for Japanese Patent Application No. 2019-079274, dated Feb. 15, 2022, 6 pages.
Notice of Allowance (no translation) for Mexican Patent Application No. MX/a/2015/015980, dated Feb. 16, 2021 2 pages.
Notification of Acceptance (English translation) for Peruvian Patent Application No. South Africa 2015/08697, dated Jan. 7, 2022, 1 page.
International Search Report and Written Opinion for International (PCT) Patent Application No. PCT/IB2020/000795, dated Jan. 5, 2021 14 pages.
International Report on Preliminary Patentability for International (PCT) Patent Application No. PCT/IB2020/000795, dated Jul. 29, 2021 8 pages.
Third Party Observation for International (PCT) Patent Application No. PCT/IB2020/000795, dated Apr. 30, 2021 7 pages.
Administrative Instructions for Third Party Observation for International (PCT) Patent Application No. PCT/IB2020/000795, dated Apr. 30, 2021 4 pages.
Official Action for Australian Patent Application No. 2020300841, dated Jun. 17, 2022 7 pages.
Official Action for Canadian Patent Application No. 3,126,627, dated Jul. 14, 2022 5 pages.
Third Party Observation for European Patent Application No. 20835636.0, dated Jul. 27, 2021 2 pages.
Extended Search Report for European Patent Application No. 20835636.0, dated Oct. 24, 2022 10 pages.
Office Action for U.S. Appl. No. 10/446,548 mailed Jul. 7, 2004, 6 pages.
Office Action for U.S. Appl. No. 10/446,548 mailed Dec. 28, 2004, 7 pages.
Office Action for U.S. Appl. No. 10/446,548 mailed Jun. 10, 2005, 8 pages.
Office Action for U.S. Appl. No. 11/927,170, mailed Jun. 20, 2008, 12 pages.
Office Action for U.S. Appl. No. 11/927,170, mailed Dec. 10, 2008, 19 pages.
Notice of Allowance for U.S. Appl. No. 11/927,170, mailed Mar. 6, 2009, 13 pages.
Office Action for U.S. Appl. No. 10/836,480 mailed Oct. 14, 2005, 17 pages.
Office Action for U.S. Appl. No. 10/836,480 mailed Apr. 3, 2006, 6 pages.
Office Action for U.S. Appl. No. 10/836,480 mailed Mar. 23, 2007, 11 pages.
Office Action for U.S. Appl. No. 10/836,480 mailed Aug. 27, 2007, 12 pages.
Office Action for U.S. Appl. No. 10/836,480 mailed Dec. 28, 2007, 8 pages.
Office Action for U.S. Appl. No. 10/836,480 mailed Jul. 9, 2008, 9 pages.
Office Action for U.S. Appl. No. 10/836,480 mailed Dec. 24, 2008, 21 pages.
Notice of Allowance for U.S. Appl. No. 10/836,480 mailed Oct. 7, 2009, 9 pages.
Office Action for U.S. Appl. No. 12/700,525, mailed Jun. 18, 2010, 6 pages (Restriction Requirement).
Office Action for U.S. Appl. No. 12/700,525 mailed Sep. 17, 2010, 12 pages.
Official Action for U.S. Appl. No. 12/700,525, mailed Mar. 17, 2011, 20 pages.
Official Action for U.S. Appl. No. 12/700,525, mailed Aug. 21, 2013 23 pages.
Official Action for U.S. Appl. No. 12/700,525, mailed Jan. 6, 2014, 9 pages.
Notice of Allowance for U.S. Appl. No. 12/700,525, mailed Apr. 15, 2014, 9 pages.
Official Action for U.S. Appl. No. 13/020,505, mailed Jan. 17, 2012 5 pages Restriction Requirement.
Official Action for U.S. Appl. No. 13/020,505, mailed Apr. 23, 2012 10 pages.
Official Action for U.S. Appl. No. 13/020,505, mailed Nov. 30, 2012 10 pages.
Notice of Allowance for U.S. Appl. No. 13/020,505, mailed Jul. 9, 2013 9 pages.
Official Action for U.S. Appl. No. 14/058,915, mailed Jan. 13, 2016 14 pages.
Final Action for U.S. Appl. No. 14/058,915, mailed Apr. 28, 2016 10 pages.
Official Action for U.S. Appl. No. 14/058,915, mailed Aug. 15, 2016 9 pages.
Final Action for U.S. Appl. No. 14/058,915, mailed Nov. 30, 2016 7 pages.
Office Action for U.S. Appl. No. 10/713,640 mailed Jul. 28, 2006.
Office Action for U.S. Appl. No. 10/713,640, mailed Dec. 31, 2007, 6 pages.
Office Action for U.S. Appl. No. 10/713,640, mailed Dec. 3, 2008, 14 pages.
Office Action for U.S. Appl. No. 10/713,640 mailed May 27, 2009, 5 pages.
Notice of Allowance for U.S. Appl. No. 10/713,640 mailed Dec. 23, 2009, 9 pages.
Office Action for U.S. Appl. No. 11/613,056 mailed Feb. 22, 2008, 25 pages.

(56) References Cited

OTHER PUBLICATIONS

Office Action for U.S. Appl. No. 11/613,056 mailed Aug. 22, 2008, 15 pages.
Notice of Allowance for U.S. Appl. No. 11/613,056 mailed Feb. 10, 2009, 12 pages.
Notice of Allowance for U.S. Appl. No. 11/613,056 mailed Apr. 10, 2009, 2 pages.
Office Action for U.S. Appl. No. 12/683,967, mailed Aug. 31, 2010, 6 pages.
Office Action (Restriction Requirement) for U.S. Appl. No. 12/683,967, mailed Feb. 11, 2011, 6 pages.
Official Action for U.S. Appl. No. 12/683,967, mailed May 19, 2011 6 pages.
Notice of Allowance for U.S. Appl. No. 12/683,967, mailed Sep. 15, 2011 5 pages.
Official Action for U.S. Appl. No. 13/313,594, mailed Apr. 5, 2013 5 pages Restriction Requirement.
Official Action for U.S. Appl. No. 13/313,594, mailed Jun. 27, 2013 8 pages.
Notice of Allowance for U.S. Appl. No. 13/313,594, mailed Nov. 26, 2013 15 pages.
Official Action for U.S. Appl. No. 13/958,683, mailed Oct. 7, 2015 5 pages Restriction Requirement.
Official Action for U.S. Appl. No. 13/958,683, mailed Nov. 5, 2015 11 pages.
Official Action for U.S. Appl. No. 13/958,683, mailed Feb. 25, 2016 13 pages.
Official Action for U.S. Appl. No. 13/958,683, mailed Jun. 20, 2016 12 pages.
Official Action for U.S. Appl. No. 13/958,683, mailed Dec. 14, 2016 8 pages.
Notice of Allowance for U.S. Appl. No. 13/958,683, mailed May 22, 2017 10 pages.
Corrected Notice of Allowance for U.S. Appl. No. 13/958,683, mailed Jun. 20, 2017 5 pages.
Official Action for U.S. Appl. No. 15/726,091, dated Jan. 11, 2019, 9 pages.
Notice of Allowance for U.S. Appl. No. 15/726,091, dated Jun. 17, 2019, 2 pages.
Official Action for U.S. Appl. No. 13/524,907, mailed Sep. 25, 2014 12 pages.
Notice of Allowance for U.S. Appl. No. 13/524,907, mailed Jan. 28, 2015 8 pages.
Official Action for U.S. Appl. No. 14/287,889, mailed Jun. 28, 2016 21 pages.
Final Action for U.S. Appl. No. 14/287,889, mailed Nov. 8, 2016 19 pages.
Official Action for U.S. Appl. No. 14/287,889, mailed Mar. 3, 2017 15 pages.
Notice of Allowance for U.S. Appl. No. 14/287,889, mailed Aug. 16, 2017 11 pages.
Notice of Allowance for U.S. Appl. No. 14/287,889, mailed Mar. 2, 2018 5 pages.
Notice of Allowance for U.S. Appl. No. 14/287,889, mailed Jul. 20, 2018, 8 pages.
Official Action for U.S. Appl. No. 15/729,961, dated Jul. 3, 2019 9 pages.
Notice of Allowance for U.S. Appl. No. 15/729,961, dated Oct. 28, 2019, 8 pages.
Official Action for U.S. Appl. No. 16/776,332, dated Jun. 2, 2021 8 pages.
Final Action for U.S. Appl. No. 16/776,332, dated Sep. 14, 2021 7 pages.
Notice of Allowance for U.S. Appl. No. 16/776,332, dated Jan. 19, 2022 8 pages.
Notice of Allowance for U.S. Appl. No. 16/776,332, dated Mar. 23, 2022 8 pages.
Third-Party Submission for U.S. Appl. No. 16/748,523, dated Apr. 28, 2021 12 pages.
Official Action for U.S. Appl. No. 16/748,523, dated Mar. 3, 2022 23 pages.
Official Action for U.S. Appl. No. 16/748,523, dated Sep. 9, 2022 25 pages.
Notice of Allowance for U.S. Appl. No. 16/748,523, dated Dec. 16, 2022 10 pages.
Correa et al., "Mineralogy of the leaching process in refractory minerals with thiosulphate solutions," Informador Técnico, 2016, vol. 80(2), pp. 128-140.
Official Action for European Patent Application No. 17193704.8, dated Mar. 15, 2023 5 pages.
Notice of Acceptance for Australian Patent Application No. 2020300841, dated Mar. 28, 2023 4 pages.
Official Action (with English informal translation) for Brazilian Patent Application No. 112021014207-0, dated Jun. 20, 2023 5 pages.
Official Action for Canadian Patent Application No. 3,126,627, dated Apr. 11, 2023 4 pages.
Official Action (with English Translation) for Eurasian Patent Application No. 202192005, dated Mar. 30, 2023 9 pages.
Official Action (with English translation) for Eurasian Patent Application No. 202192005, dated Nov. 10, 2023 10 pages.
Official Action for Canadian Patent Application No. 3,126,627, dated Feb. 16, 2024 4 pages.
Official Action (with English translation) for Brazilian Patent Application No. 112021014207-0, dated Mar. 5, 2024 8 pages.
Official Action (with English translation) for Brazilian Patent Application No. BR122023018938-8, dated Mar. 7, 2024 8 pages.
Official Action (with English translation) for Brazilian Patent Application No. BR122023018907-8, dated Mar. 8, 2024 9 pages.
Notice of Allowance (English translation) for Papua New Guinea Patent Application No. PG/P/2013/00033, dated Mar. 15, 2024 1 page.

* cited by examiner

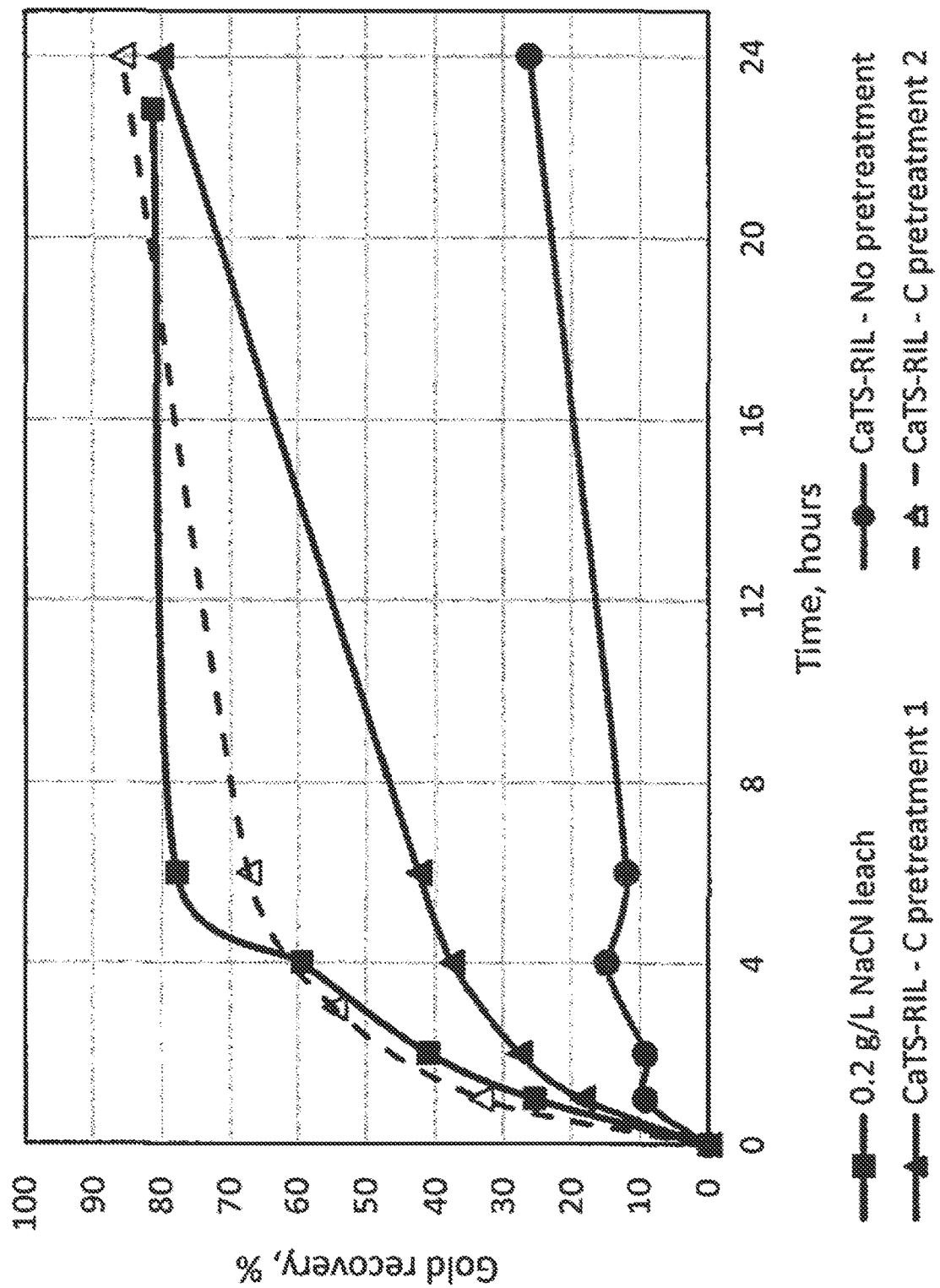
FIG. 2: EFFECT OF CARBON PRETREATMENT ON GOLD RECOVERY FROM SAMPLE S1 BY CaTS-RIL

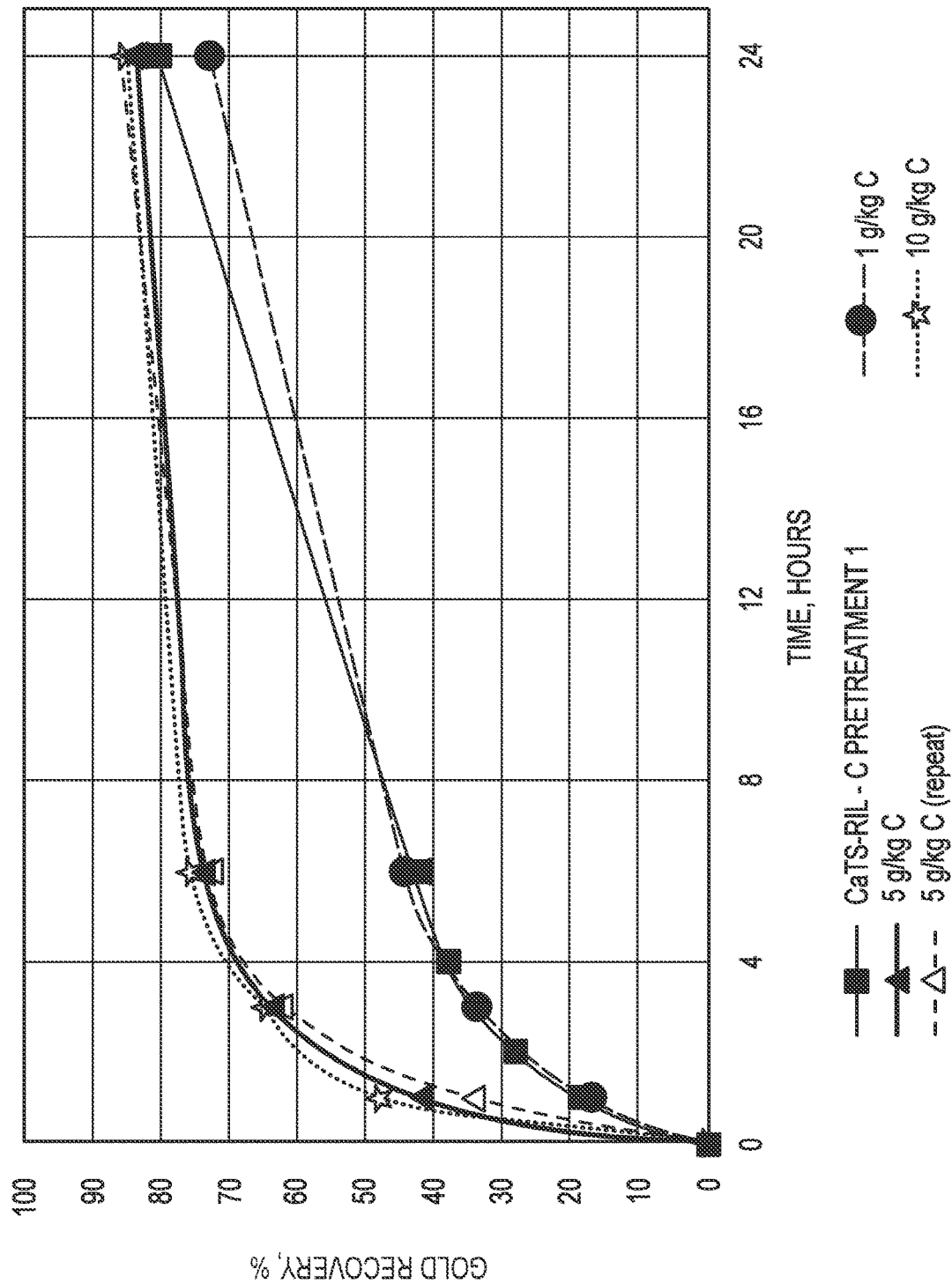
FIGURE 3: EFFECT OF CARBON PRETREATMENT AND FINE CARBON ON THIOSULFATE LEACH RECOVERY FROM SAMPLE S1

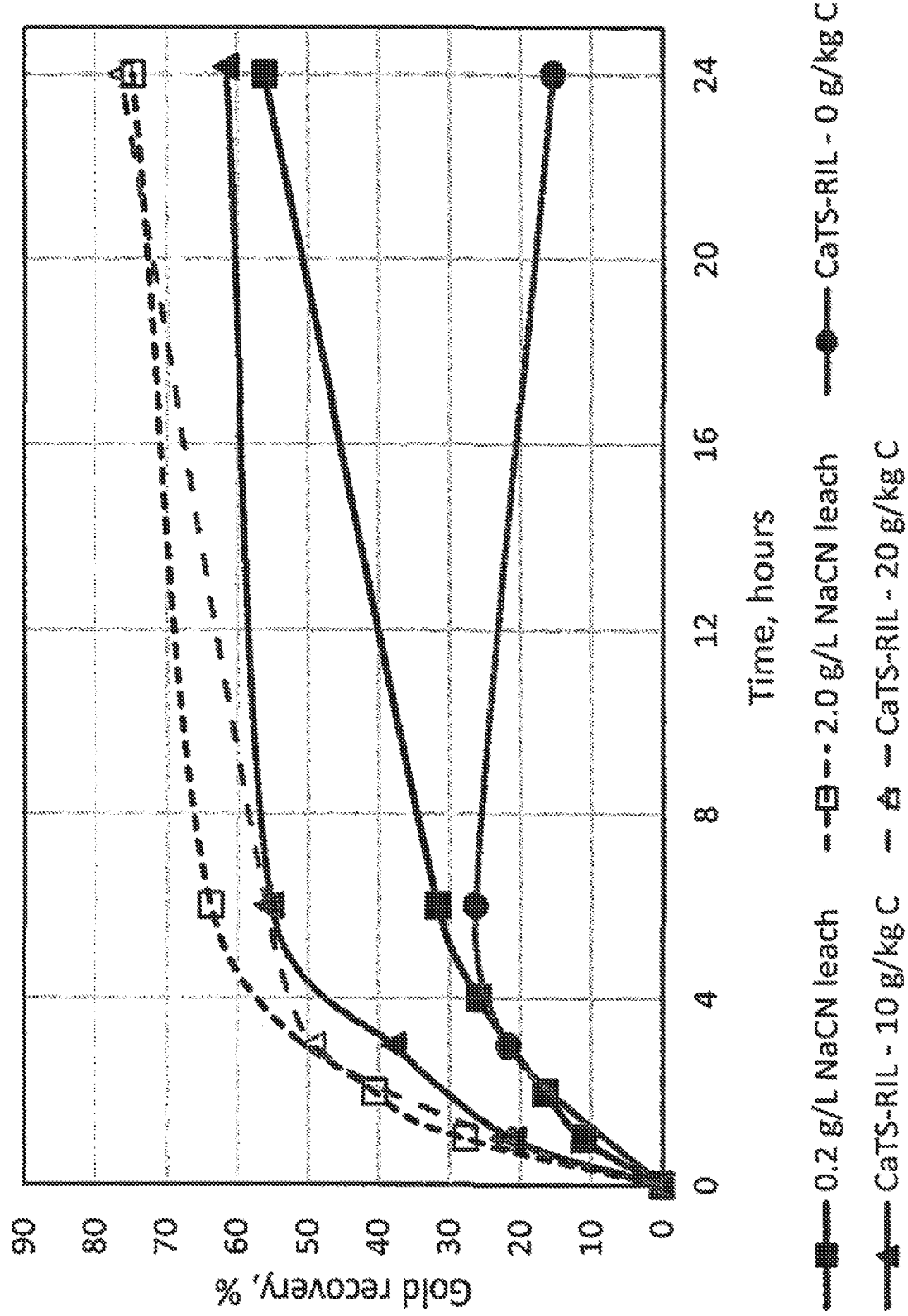
Fig. 4: Effect of Fine Carbon on Gold Recovery from the Carbon Flotation Tails

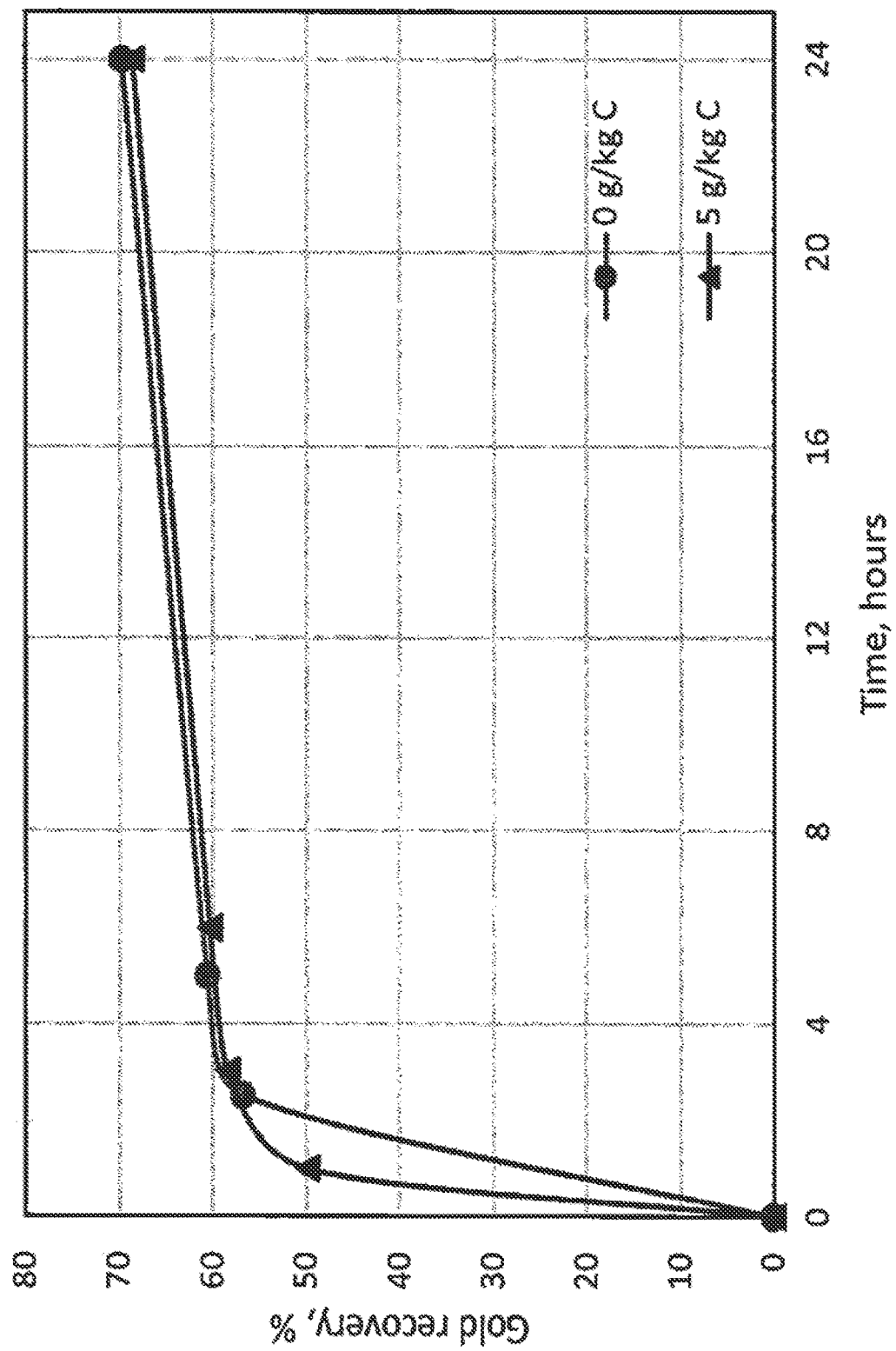
Fig. 5: EFFECT OF FINE CARBON ON THE GOLD RECOVERY BY THIOSULFATE FROM SAMPLE S3

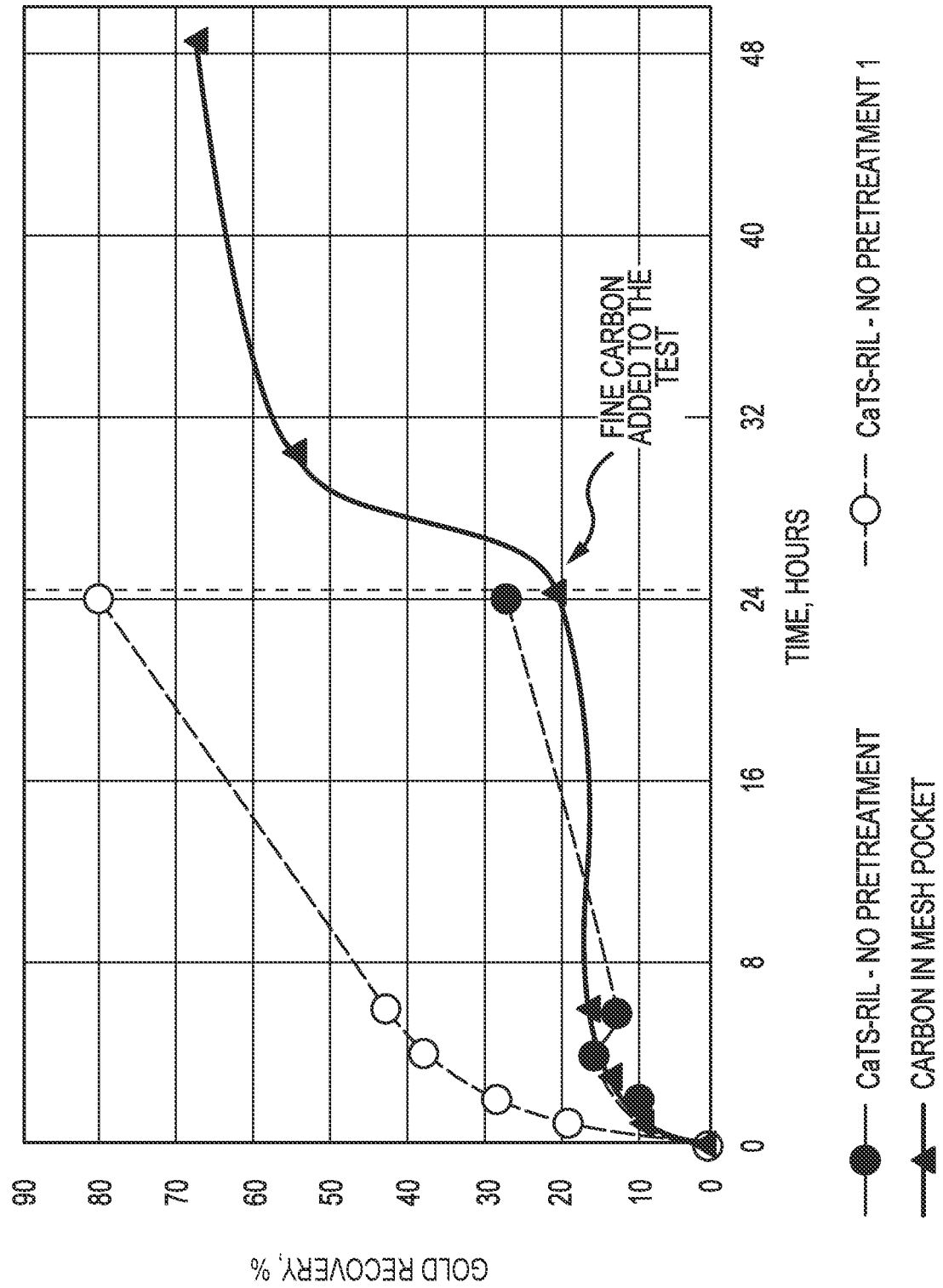
FIGURE 6: EFFECT OF CARBON PRETREATMENT ON GOLD RECOVERY FROM SAMPLE S1

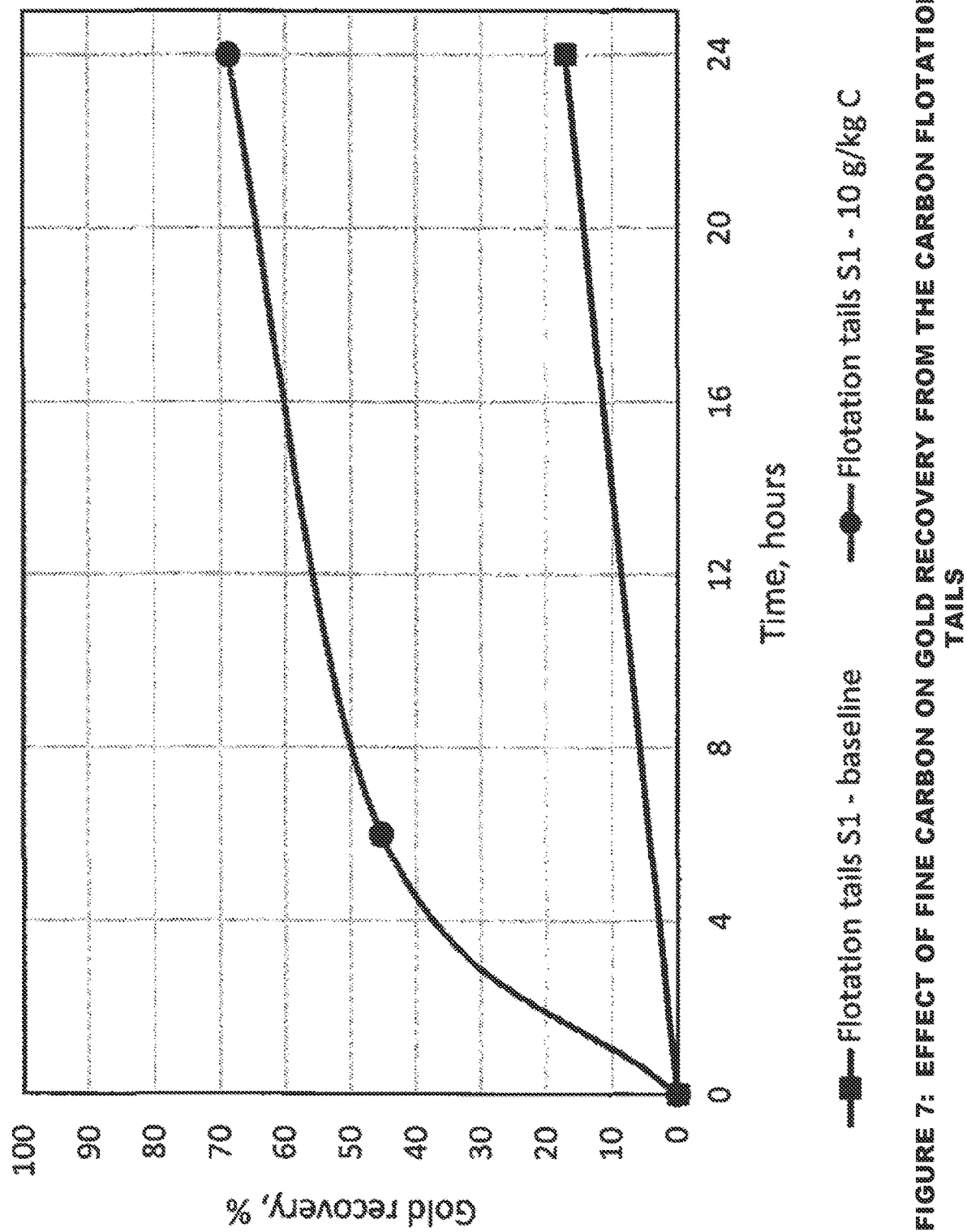
FIGURE 7: EFFECT OF FINE CARBON ON GOLD RECOVERY FROM THE CARBON FLOTATION TAILS

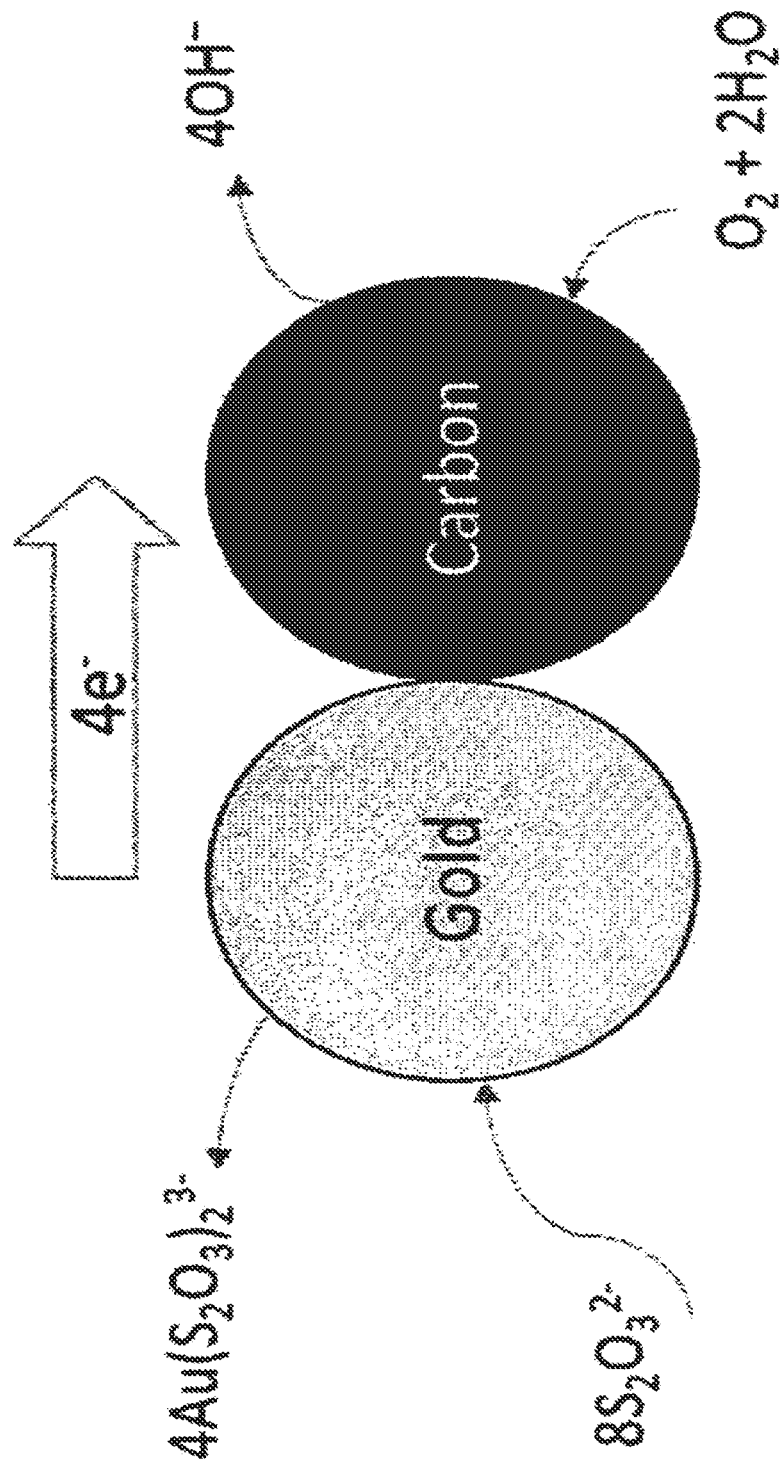
FIGURE 8: GALVANIC INTERACTIONS BETWEEN GOLD AND CARBON

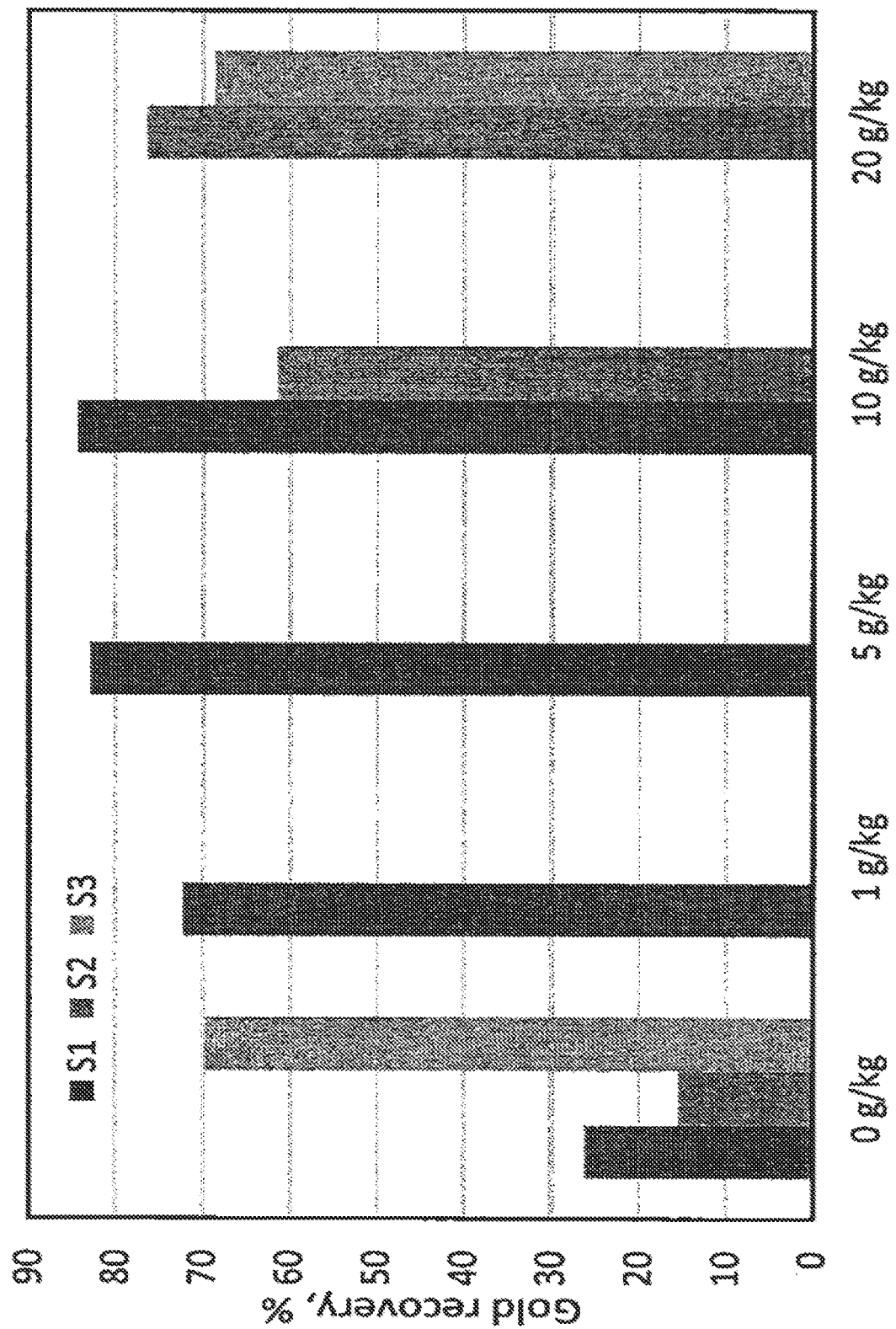
FIGURE 9: EFFECT OF ACTIVATED CARBON ON GOLD RECOVERY BY THIOSULFATE

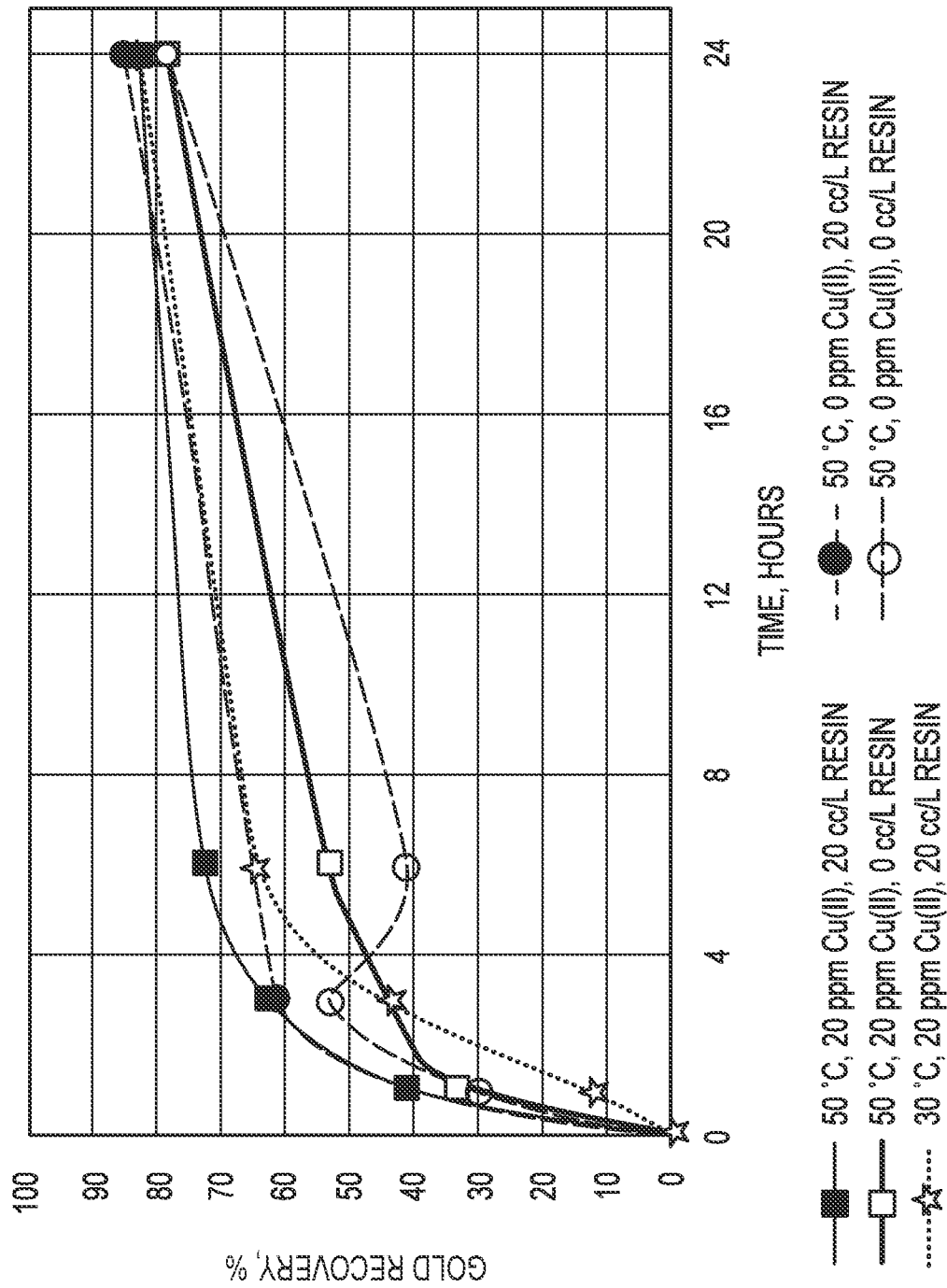
FIGURE 10: EFFECT OF COPPER, RESIN AND TEMPERATURE ON THE CARBON-ASSISTED (10 g/Kg) THIOSULFATE LEACHING OF GOLD FROM S1

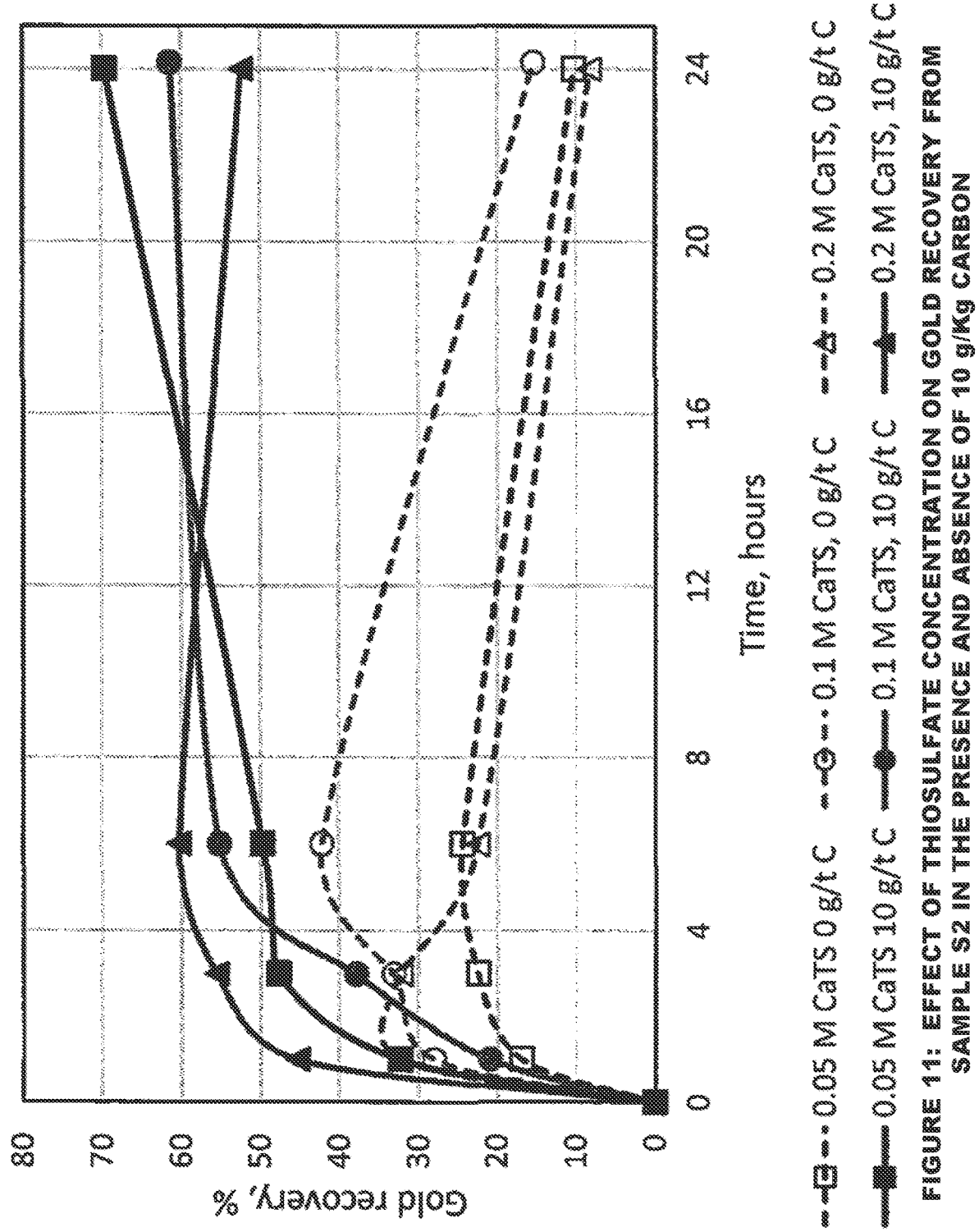
FIGURE 11: EFFECT OF THIOSULFATE CONCENTRATION ON GOLD RECOVERY FROM SAMPLE S2 IN THE PRESENCE AND ABSENCE OF 10 g/Kg CARBON

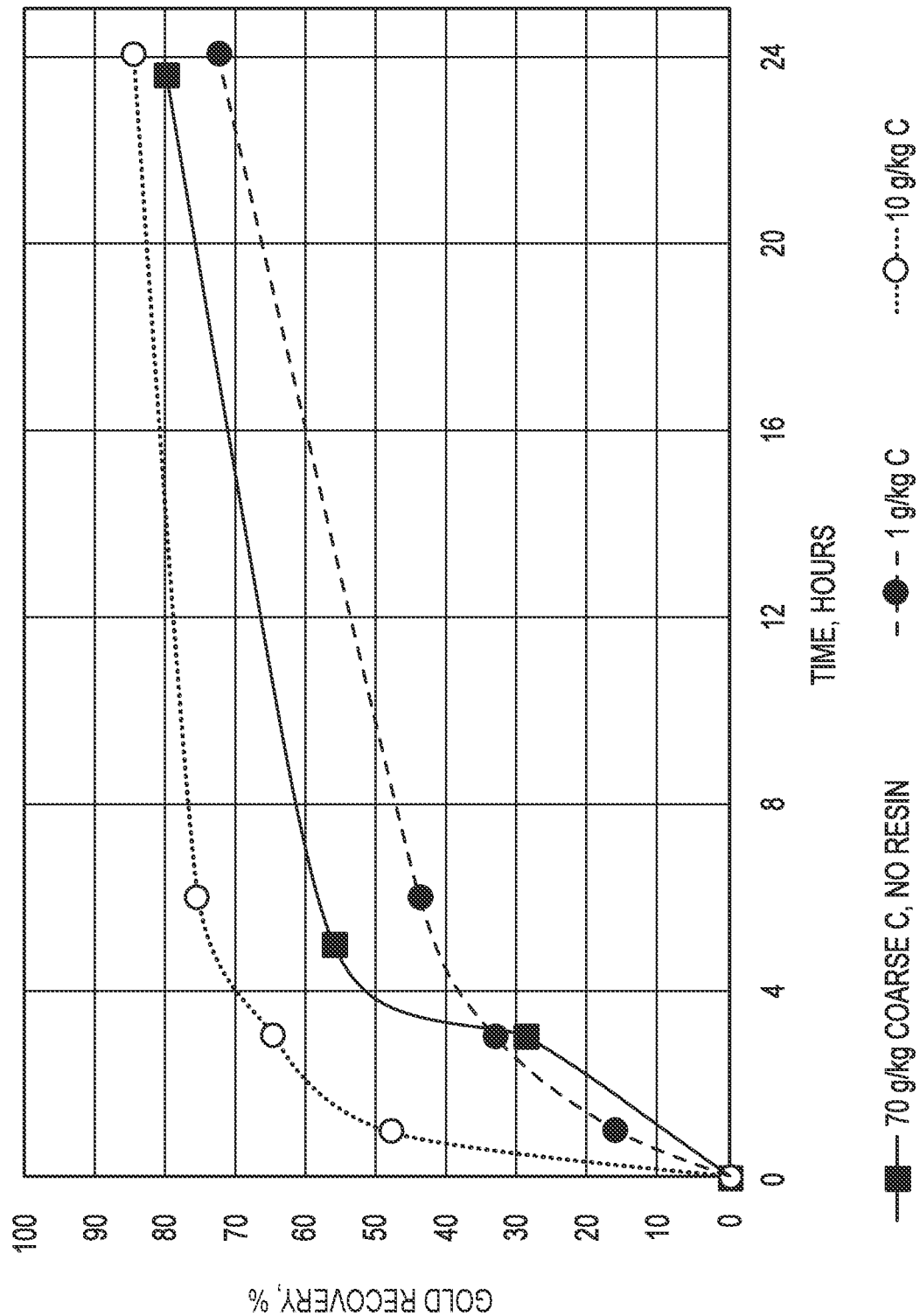
FIGURE 12: EFFECT OF COARSE ACTIVATED CARBON ON GOLD RECOVERY BY THIOSULFATE LEACHING

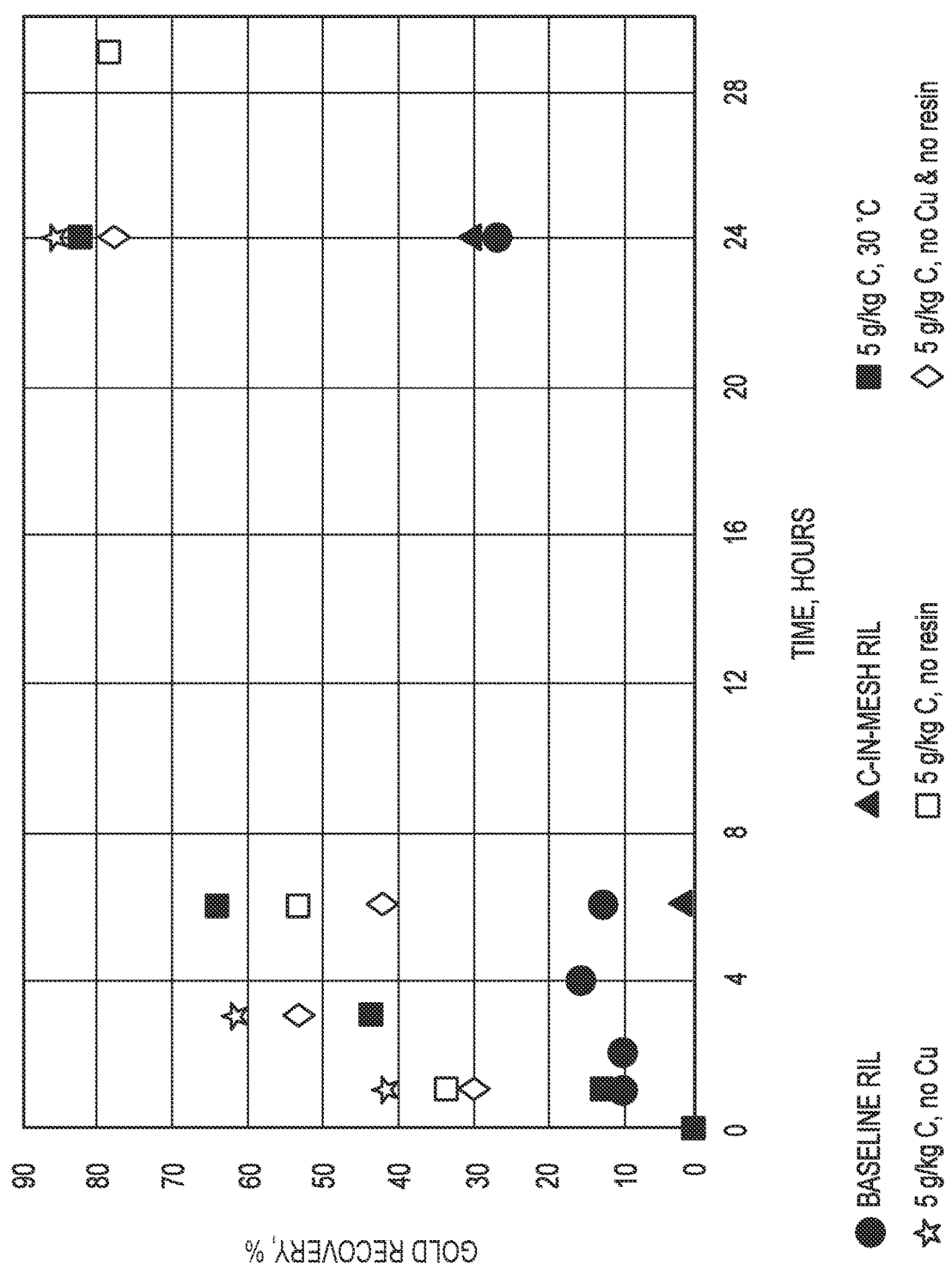

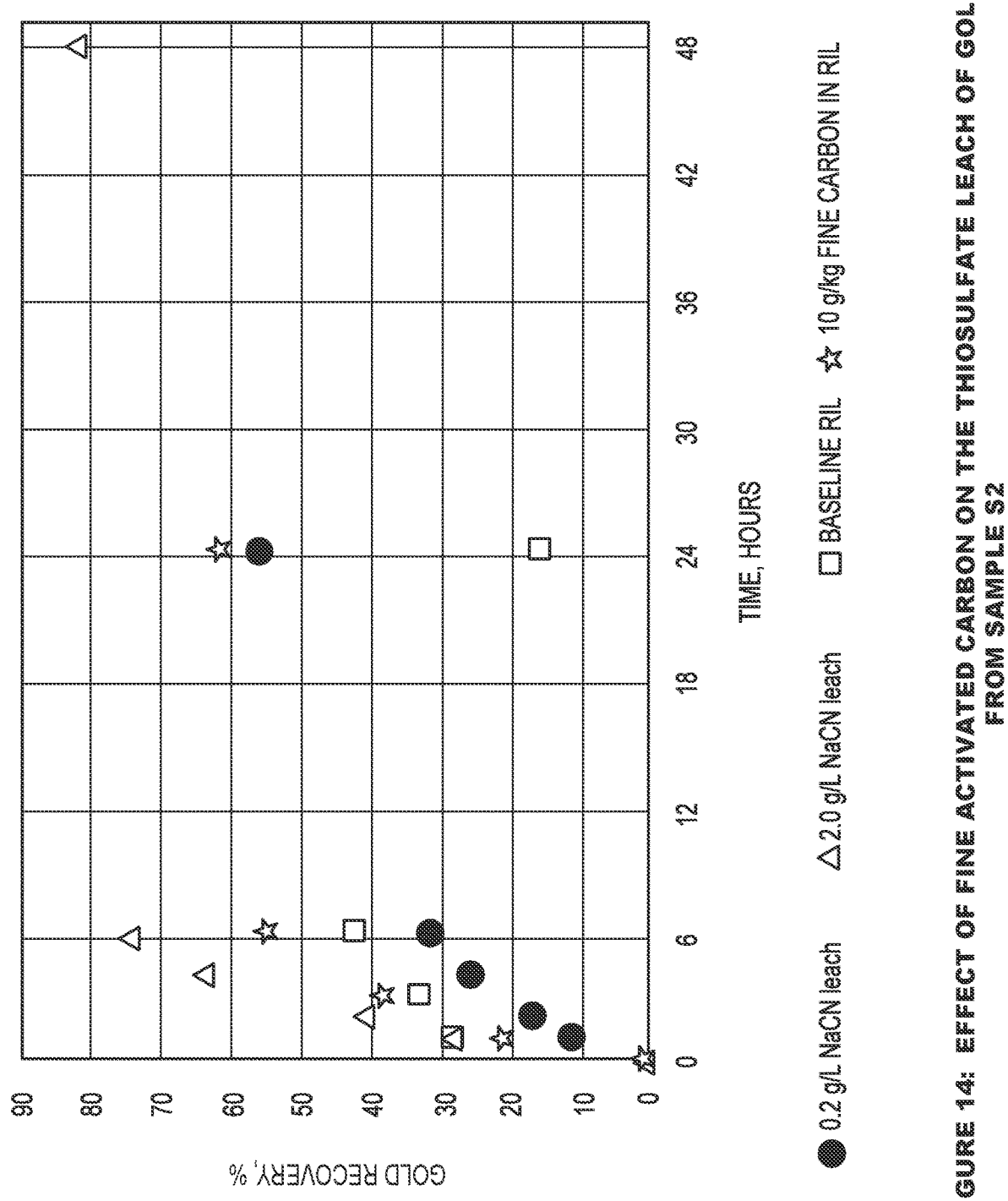
FIGURE 14: EFFECT OF FINE ACTIVATED CARBON ON THE THIOSULFATE LEACH OF GOLD FROM SAMPLE S2

METHOD FOR CARBON-CATALYSED THIOSULFATE LEACHING OF GOLD-BEARING MATERIALS

CROSS REFERENCE TO RELATED APPLICATIONS

The present application is a continuation under 35 U.S.C. § 120 and claims the benefit of priority to U.S. application Ser. No. 16/748,523, filed Jan. 21, 2020, which claims the benefit of and priority to U.S. Provisional Application Ser. No. 62/819,005, filed Mar. 15, 2019, and U.S. Provisional Application Ser. No. 62/794,887, filed Jan. 21, 2019, and, entitled "METHOD FOR THIOSULFATE LEACHING OF GOLD-BEARING MATERIALS", and which are incorporated herein by reference in their entireties.

FIELD

The invention relates generally to leaching of metal-containing materials and particularly to thiosulfate leaching of precious metal-bearing materials.

BACKGROUND

The conventional cyanidation/carbon in pulp process has been the main gold extraction method for decades. The lixiviant most commonly used in gold leaching is cyanide. Cyanide possesses a relatively low cost, its chemistry is simple and well known, and forms strong complexes with gold that are stable in aqueous solutions. While cyanidation is effective for leaching gold from some carbonaceous or complex ores, there are serious environmental concerns associated with the use of cyanide in gold leaching processes and for certain gold ores, such as carbonaceous ores, cyanide can have high reagent consumption.

Thiosulfate is among the more successful alternative lixiviants for effective leaching of gold. An example of a thiosulfate leaching process for precious metal-bearing materials is shown in U.S. Pat. No. 7,544,232. The ammonia-thiosulfate system commonly uses cupric ions as oxidant. This is because the low solubility of oxygen and its slow reduction rates on gold surfaces result in slow dissolution rates. While cupric ions are a better oxidant for gold than oxygen, oxygen is still required to regenerate the oxidant; unfortunately, the combination of oxygen and copper in the ammonia-thiosulfate system has been reported to increase the degradation rate of thiosulfate to produce tetrathionate and other polythionates. Ammonia-free thiosulfate systems can be more attractive from an environmental point of view.

Due to the need for an environmentally acceptable replacement to cyanide in gold leaching, significant work has been done on how to improve thiosulfate leach kinetics. Thiosulfate leach experiments at temperatures and oxygen overpressures ranging 40-80° C. and 10-100 psi, respectively, have found that gold recovery was affected by temperature and thiosulfate concentration but was less sensitive to the oxygen overpressure. Increases in temperature, and Cu(II) and dissolved oxygen concentrations have been found to have a positive effect on the dissolution rate of gold. The rate of gold dissolution can be increased in the presence of sulfide minerals due to galvanic interactions where the reduction rate of oxygen was faster on the surface of sulfide minerals than on the surface of gold. Finally, U.S. Pat. No. 10,161,016 teaches a process to pretreat thiosulfate-refractory oxide ores using activated carbon. In the pretreatment process, the ore slurry is contacted with activated carbon in the presence of oxygen prior to the thiosulfate leach. The pretreatment process was found to increase gold recovery from 23-26% to 71-86%.

Unfortunately, the performance of thiosulfate in the leaching of gold can be very ore sensitive. Some oxide ores may be refractory in nature. They neither yield sufficient gold leaching in a thiosulfate leach system nor are leached as effectively compared to cyanide. Thiosulfate gold extraction from some oxide ores can be minimal. As oxide ores do not contain sulfides (or have very low levels of sulfide), the refractory nature cannot be mitigated in the same manner as for sulfide ores (e.g., by roasting, bio-oxidation or pressure oxidation).

There is a need for a thiosulfate leaching method to address the refractory nature of certain oxide ores in the thiosulfate leach system.

SUMMARY

These and other needs are addressed by the various embodiments and configurations of the present invention. The disclosure is directed generally to leaching precious metal-bearing materials with thiosulfate in the presence of carbon.

In some embodiments, the leaching process can include the steps:
 (a) providing a particulate carbon-based material comprising one or more of activated carbon, activated charcoal, coke, hard carbon derived from at least one of coconut shells and elemental carbon, a calcined resin, and mixtures thereof;
 (b) providing a precious metal-bearing material having a first precious metal thiosulfate leaching value in the absence of contact with the particulate carbon-based material;
 (c) contacting the precious metal-bearing material with the particulate carbon-based material, thiosulfate, an anion exchange resin, and an oxidant to form a slurry; and
 (d) leaching a precious metal from the slurried precious metal-bearing material, wherein the anion exchange resin has a greater affinity for the leached precious metal than the particulate carbon-based material and wherein the slurried precious metal-bearing material has a second precious metal thiosulfate leaching value that is more than the first precious metal thiosulfate leaching value.

In some embodiments, the leaching process can include the steps:
 a) contacting a gold-bearing material with a carbon-based material and one or more of a thiosulfate lixiviant and an anion exchange resin to form a slurry, the carbon-based material comprising one or more of activated carbon, activated charcoal, coke, hard carbon derived from at least one of coconut shells and elemental carbon, a calcined resin, and mixtures thereof;
 b) thereafter contacting the slurry with an oxidant to leach gold from the gold-bearing material and deposit the leached gold onto the anion exchange resin; and
 c) contacting the gold-containing anion exchange resin with an eluant to from a gold-containing eluant and a barren ion exchange resin for recycle to step (a).

In some embodiments, the leaching process can include the steps:
 a) contacting a precious metal-bearing material with a particulate carbon-based material, thiosulfate, and an anion exchange resin to form a slurry, wherein the precious metal-bearing material having a first precious metal thiosulfate leaching value in the absence of contact with the particulate carbon-based material and wherein the particulate carbon-based material comprising one or more of activated carbon, activated charcoal, coke, hard carbon derived from at least one of coconut shells and elemental carbon, a calcined resin, and mixtures thereof; and b) contacting the slurry with an oxidant to leach a precious metal from the slurried precious metal-bearing material, wherein the anion exchange resin has a greater affinity for the leached precious metal than the particulate carbon-based material and wherein the slurried precious metal-bearing material has a second precious metal thiosulfate leaching value that is more than the first precious metal thiosulfate leaching value.

The precious metal, for example, can be gold.

Leaching can be performed in the presence of molecular oxygen but in the absence or substantial absence of a surrogate oxidant, such as copper.

The addition of a carbon-based material, such as fine activated carbon, can result in increased dissolution rates and gold recoveries. While not wishing to be bound by any theory, it is believed that the carbon-based material and the precious metal, such as gold, form galvanic couples and that the rate of oxygen reduction is increased due to the increased surface area available on finely sized carbon-based material. In particular, the use of activated carbon as a catalyst in the thiosulfate leach of gold is a process alternative that may not require the addition of surrogate oxidants (like copper), can work at temperatures as low as 30° C., and can have low thiosulfate degradation, making it an attractive alternative for the leaching of gold.

Whether or not carbon is removed after leaching depends on the particle size of the carbon employed. When coarse carbon is employed, the carbon is typically removed. When fine carbon is employed, the carbon is typically not removed.

Finely sized carbon can be contacted with the precious metal-bearing material either separately after grinding of the material or before and/or during grinding. In the latter case, the carbon particles can be coarsely sized but are ground to a fine size distribution similar to a size distribution of the ground precious metal-bearing material.

Prior to leaching, the slurried precious metal-bearing material can be substantially free of contact with the oxidant.

The various slurry components can be added in any order. In some applications, the anion exchange resin and/or thiosulfate lixiviant is contacted with the precious metal-bearing material before the carbon-based material.

The precious metal-bearing material can be amenable to cyanide leaching (and therefore is not cyanide refractory) but not to thiosulfate leaching (i.e., the material is a thiosulfate refractory precious metal-bearing material). In other words, leaching of precious metals from the precious metal-bearing material by cyanide can be more effective than precious metal leaching by thiosulfate. Even when leaching of the precious metal-bearing material has similar precious metal recoveries using either cyanide or thiosulfate as the lixiviant, the leaching process of this disclosure can enhance further precious metal recovery by thiosulfate. The precious metal-bearing material may or may not be concentrated. Generally, the precious metal is in a matrix that is predominantly one or more oxides. By way of example, the precious metal-bearing material can contain more oxides than sulfides.

The gold recovery process can be carried out under ambient conditions (room temperature and atmospheric pressure) in less than 24 hours. Increasing the process temperature can further improve the gold recovery and/or pretreatment kinetics.

The carbon-based material can be removed from the pre-treated slurry by screening, which generally requires about 95% or more, and even more commonly about 98% or more of the carbon to be retained on the screen while about 90% or more and more commonly about 95% or more of the precious metal-bearing material passes through the screen. The relative mean, median, mode, and $P_{80}$ particle sizes of the carbon and precious metal-bearing material are selected to produce at least these levels of separation.

After carbon separation, the leached slurry can be discharged in tailings and the recovered carbon-based material recycled to the leaching step.

The present disclosure can provide a number of advantages depending on the particular configuration. Thiosulfate leaching oxide ores in oxygenated water in the presence of activated carbon or other carbon-based materials can improve significantly the gold recovery otherwise realized by thiosulfate leaching. The process can have a low operating cost and provide a straightforward method to thiosulfate leach gold from oxides. Attrition, due to mixing of the slurry, is commonly the only cause for carbon loss and may be minimized by proper engineering of the agitators and reactors. The carbon-based material can be recycled and re-used, thereby decreasing operating costs. Inexpensive air (or more expensive oxygen gas) are the only reagents consumed, thereby making the economics of the process very attractive.

These and other advantages will be apparent from the disclosure of the aspects, embodiments, and configurations contained herein.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "activated carbon" is a form of carbon processed to be riddled with small, low-volume pores that increase the surface area available for adsorption or chemical reactions. Activated carbon can be granular, extruded, bead, impregnated, and/or polymer coated.

The term "carbon" includes a carbon-containing organic material, such as one or more of activated carbon (or activated charcoal or activated coal), coal (e.g., peat, lignite, sub-bituminous coal, bituminous coal, steam coal, anthracite, and graphite), brown coal, coke, hard carbon derived from coconut shells or elemental carbon, a calcined resin, and mixtures thereof.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

The term "precious metal" refers to gold and silver.

A "thiosulfate refractory" precious metal-bearing material is a material in which at least part of the precious metal-bearing material is naturally resistant to recovery by thiosulfate leaching.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The accompanying drawing is incorporated into and forms a part of the specification to illustrate several examples of the present disclosure. This drawing, together with the description, explains the principles of the disclosure. The drawing simply illustrates preferred and alternative examples of how the disclosure can be made and used and is not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 2 is a plot of gold recovery (vertical axis) against time (horizontal axis) and illustrates the effect of carbon pretreatment on gold recovery from sample S1 by CaTS-RIL;

FIG. 3 is a plot of gold recovery (vertical axis) against time (horizontal axis) and illustrates the effect of carbon pretreatment and fine carbon on thiosulfate leach recovery from sample S1;

FIG. 4 is a plot of gold recovery (vertical axis) against time (horizontal axis) and illustrates the effect of fine carbon on gold recovery from the carbon flotation tails;

FIG. 5 is a plot of gold recovery (vertical axis) against time (horizontal axis) and illustrates the effect of fine carbon on gold recovery by thiosulfate from sample S-3;

FIG. 6 is a plot of gold recovery (vertical axis) against time (horizontal axis) and illustrates the effect of carbon pretreatment on gold recovery from sample S1;

FIG. 7 is a plot of gold recovery (vertical axis) against time (horizontal axis) and illustrates the effect of fine carbon on gold recovery from the carbon flotation tails;

FIG. 8 depicts the galvanic interactions between gold and carbon;

FIG. 9 is a plot of gold recovery (vertical axis) against carbon concentration (horizontal axis) and illustrates the effect of activated carbon on gold recovery by thiosulfate;

FIG. 10 is a plot of gold recovery (vertical axis) against time (horizontal axis) and illustrates the effect of copper, resin and temperature on the carbon-assisted (10 kg/g) thiosulfate leaching of gold from S1;

FIG. 11 is a plot of gold recovery (vertical axis) against time (horizontal axis) and illustrates the effect of thiosulfate concentration on gold recovery from sample S2 in the presence and absence of 10 g/kg carbon;

FIG. 12 is a plot of gold recovery (vertical axis) against time (horizontal axis) and illustrates the effect of coarse activated carbon on gold recovery by thiosulfate leaching;

FIG. 13 is a plot of gold recovery (vertical axis) against time (horizontal axis) and illustrates the effect of carbon-solids contact on thiosulfate gold leaching; and FIG. 14 is a plot of gold recovery (vertical axis) against time (horizontal axis) and illustrates the effect of fine activated carbon on the thiosulfate leach of gold from sample S2.

DETAILED DESCRIPTION

Overview

Figure 1:
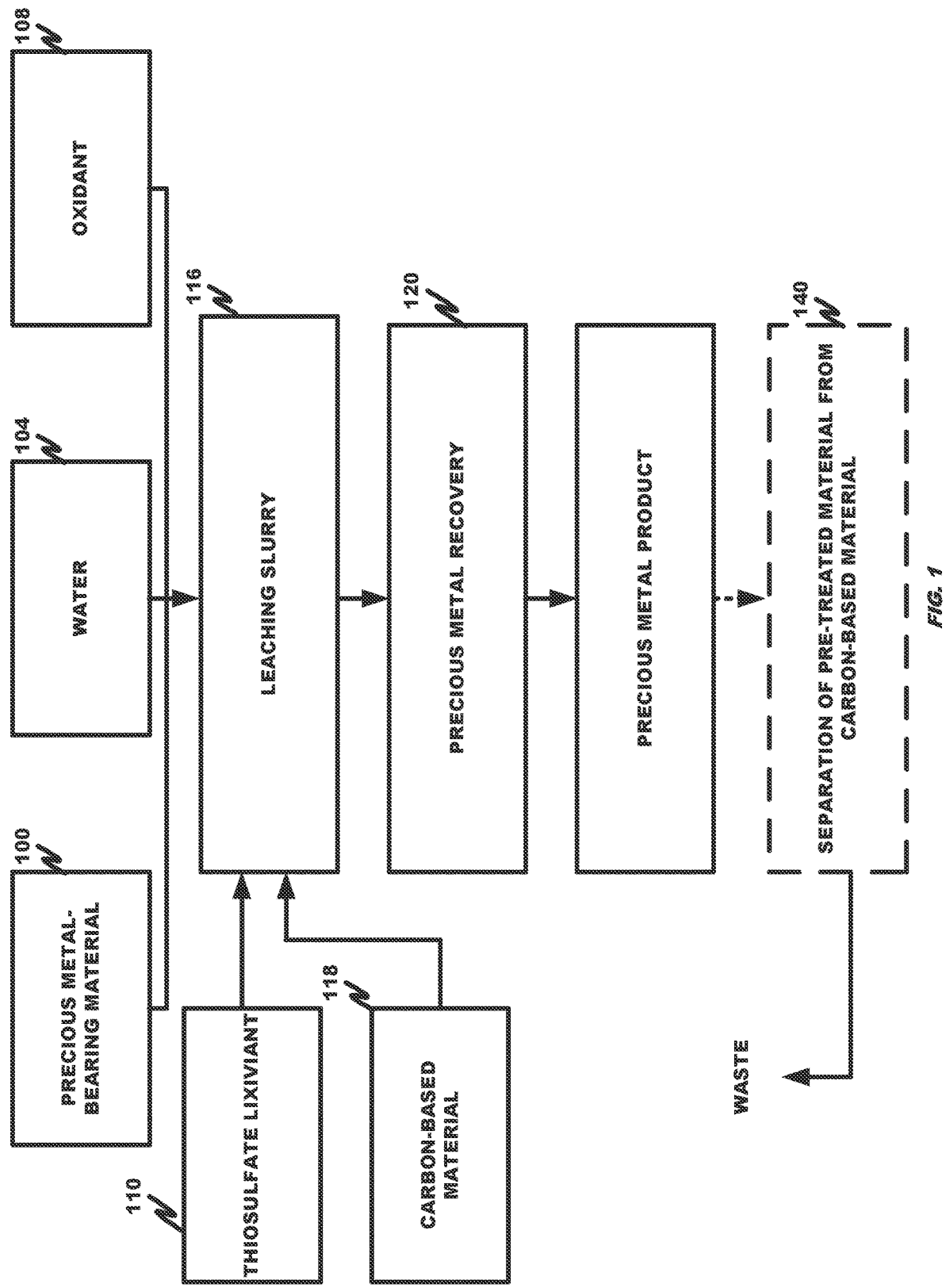
FIG. 1 is a process flow schematic according to an embodiment of the disclosure.

The present disclosure provides a process for leaching precious metal-bearing materials. The process can be performed prior to or during thiosulfate leaching and improve the overall precious metal recovery of thiosulfate refractory precious metal-bearing materials. Leaching is done by substantially simultaneously mixing a slurry containing the precious metal-bearing material, water, thiosulfate, a carbon-based material, and dissolved molecular oxygen (as the oxidizing reagent) and performing leaching in the presence of the various components for a predetermined residence time. The carbon-based material is maintained in the slurry during leaching to provide increased gold recoveries compared to the prior art.

In some applications, the thiosulfate lixiviant is contacted with the slurried precious metal-bearing material before the carbon-based material. Typically, at least about 50 mole %, more typically at least about 75 mole %, and even more typically at least about 95 mole % of the thiosulfate lixiviant contacted with the slurried precious metal-bearing material before any or most of the carbon-based material is added to the slurry. Stated differently, the slurried precious metal-bearing material typically contains more than about 0.001, more typically more than about 0.0025, and more typically more than about 0.005 molar thiosulfate before contact with any or most of the carbon-based material.

In some applications, a precious metal ion exchange resin is contacted with the slurried precious metal-bearing material before the carbon-based material. Typically, at least about 50 wt. %, more typically at least about 75 wt. %, and even more typically at least about 95 wt. % of the ion exchange resin contacted with the slurried precious metal-bearing material before any or most of the carbon-based material is added to the slurry.

Surprisingly and unexpectedly, the amount of carbon-based material required to realize a relatively high gold recovery (e.g., of at least about 80%, more typically of at least about 85%, more typically of at least about 90%, and more typically of at least about 95%) is relatively low compared to the pretreatment process of U.S. Pat. No. 10,161,016. While not wishing to be bound by any theory, it is believed that the carbon-based material and precious metal form a galvanic couple and that oxygen reduction rate is increased due to the increased surface available on the carbon-based material. The use of activated carbon, in particular, as a catalyst in the thiosulfate leach of the precious metal may not require the addition of surrogate oxidants (like copper) and that can work at lower temperatures, making the process more attractive for leaching gold when cyanide use is not an option. The reduced carbon requirements enable the carbon-based material to be discarded with the tailings without substantially reducing the economic viability of the process.

The precious metal-bearing material can be an oxide ore, concentrate, tailings, leach residue, calcine, and other precious metal-bearing oxide materials. Typical precious metal-bearing oxide ores and concentrates may contain silicates, phosphates, iron oxides, and hydroxides, and relatively low levels of residual sulfides.

The optimum solution thiosulfate concentration to maintain during leaching and therefore the optimum solution thiosulfate concentration in the thiosulfate lixiviant will depend on the nature of the material being leached, but will typically range from about 0.005 to about 2 molar (M), more typically about 0.02 to about 0.5 M, and even more typically from about 0.05 to about 0.2 M. The source of the fresh thiosulfate 148 can be any available thiosulfate-containing compound, such as sodium thiosulfate, potassium thiosulfate, calcium thiosulfate, ammonium thiosulfate, or any other thiosulfate containing material or thiosulfate precursor. In some embodiments, the thiosulfate lixiviant is substantially free of ammonia, with no more than about 25%, more typically no more than about 10%, and even more typically no more than about 5% of the thiosulfate being compounded with ammonia.

While leaching may be performed at atmospheric, sub-atmospheric or super-atmospheric pressure and across a wide range of slurry temperatures, the catalytic effect of the carbon-based material surprisingly enables leaching to occur rapidly at temperatures as low as 30 degrees Celsius.

An embodiment of a leaching process will be discussed with reference to FIG. 1.

In a typical implementation of the leaching process, the precious metal-bearing material 100 is mixed, in a stirred tank, vat, or other suitable reactor, with an oxidant 108, thiosulfate lixiviant 110, and the carbon-based material 118, such as activated carbon, thiosulfate, and water 104 to form the leaching slurry 116. The oxidant 108, commonly molecular oxygen, is typically contacted by sparging the slurry. The molecular oxygen can be supplied by a suitable source, such as air, oxygen-enriched air, or industrially-pure oxygen, with ambient air being preferred. The process can be carried out in any water source, whether raw water or relatively clean process water. Other suitable reactors, such as pulse columns, can be any reactor able to adequately mix carbon, the slurried precious metal-bearing material, and gas.

It has been surprisingly and unexpectedly discovered, however, that relatively high leaching kinetics can be realized without a pre-treatment step as disclosed in U.S. Pat. No. 10,161,016. A typical implementation of the leaching process of FIG. 1 therefore excludes (or is performed in the absence of) a pre-treatment step. Commonly, the various components, namely the precious metal-bearing material 100, water 104, thiosulfate lixiviant 110, and carbon-based material 118 are added substantially simultaneously (e.g., before the commencement of precious metal leaching or before contact of the slurry with a precious metal ion-exchange resin in a resin-in-leach or resin-in-pulp leaching process, before solvent extraction in a solvent extraction leaching process). In some implementations, the various components are added before addition of the oxidant 108, though the oxidant 108 can in other implementations be added substantially simultaneously with the other components. In some implementations, the precious metal-bearing material 100, water 104, and carbon-based material 118 are combined before, during, or immediately after comminution but before oxidant 108 addition. Thiosulfate lixiviant 110 may or may not be added before or during comminution.

Referring again to FIG. 1, the thiosulfate lixiviant 110 in the reactor leaches one or more precious metals from the precious metal-bearing material 100. Due to presence of the carbon-based material 118 during leaching, other surrogate oxidants 108 (besides molecular oxygen) are not typically required during precious metal recovery 120.

The absence or substantial absence of (added and/or total) copper in the leach during precious metal recovery 120 can greatly simplify the process. Elimination or near-elimination of (added and/or total) copper from the leach during precious metal recovery 120 can provide the advantage of allowing for a consistently high and reproducible precious metal extraction over a broader pH range than was previously possible with the other thiosulfate leaching processes. Oxidative degradation of thiosulfate to polythionates and sulfates is accelerated markedly in the presence of copper ions. The oxidative degradation reactions are slowed considerably at elevated oxygen partial pressure in the absence or near-absence of copper. Typically, the (added and/or total solution) copper concentration is no more than about 20 ppm, more typically no more than about 15 ppm, more typically no more than about 10 ppm, more typically no more than about 5 ppm, and even more typically no more than about 2.5 ppm. In this process, leaching can be operated at about pH 7-12, typically about pH 8-11, more typically about pH 8-10, and even more typically at a pH less than pH 9. The oxidation-reduction potential (ORP) during precious metal recovery 120 typically ranges from about 100 to about 350 mV and more typically from about 150 to about 300 mV (vs. the standard hydrogen electrode (SHE)).

The weight ratio of the carbon-based material 116 (either added or total (including both added and natively occurring carbon-based material in the precious metal-bearing material) to the precious metal-bearing material 100 during precious metal recovery 120 can vary depending on the requirements of the specific ore, the properties of the carbon-based material itself, and the desired level of precious metal recovery. In some applications, for coarsely sized carbon-based material 118 the weight ratio of the precious metal-bearing material 100 to the carbon-based material 118 is typically more than about 50:1, more than about 100:1, more typically at least about 125:1, more typically at least about 150:1, more typically at least about 175:1, and more typically at least about 200:1. In some applications, the weight ratio of the precious metal-bearing material 100 to the carbon-based material 118 is no more than about 1,000:1, more typically no more than about 850:1, more typically no more than about 750:1, more typically no more than about 650:1, and more typically no more than about 500:1. In other applications, lower weight ratios of the precious metal-bearing material 100 to the carbon-based material 118 are employed.

In some embodiments, the precious metal-bearing material is substantially free of organic carbon. Stated differently, the precious metal-bearing material typically comprises no more than about 1 wt. %, more typically comprises no more than about 0.5 wt. %, more typically comprises no more than about 0.25 wt. %, more typically comprises no more than about 0.1 wt. %, more typically comprises no more than about 0.05 wt. %, and even more typically comprises no more than about 0.01 wt. %, organic carbon.

The finely sized carbon particles in the carbon-based material 118 are generally not separated from the particles of the leached barren precious metal-bearing material 100. After precious metal recovery, the finely sized carbon particles are typically sent to tailings or waste along with the leached precious metal barren material 100. However, as shown by optional step 140, the carbon particles can be separated from the leached precious metal barren material, such as by screening (for carbon particles coarser than the leached precious metal barren material) or flotation, and discarded separately or recycled to the leaching slurry 116.

The finely sized carbon particles in the carbon-based material 118 can be formed by adding coarse carbon into the grinding stage to grind the precious metal-bearing feed material and carbon together to form a combined precious metal-bearing and carbon-containing feed to the mixing stage. The fully comminuted material particle size of the carbon-based material 118 and precious metal-bearing material 100 is typically at least smaller than 80% passing about 48 mesh (300 microns), more typically 80% passing about 100 mesh (150 microns), and most typically 80% passing about 200 mesh (75 microns).

Leaching during precious metal recovery 120 is typically done by resin-in-pulp ("RIP") treatment. Resin-in-pulp treatment can be performed in any suitable vessel. A preferred vessel is a Pachuca tank, which is an air-agitated, conical bottomed vessel, with air being injected at the bottom of the cone. An advantage of the Pachuca system is reduced resin bead breakage and improved dispersion of the resin beads in the slurry as compared to mechanically agitated systems. The RIP recovery is preferably carried out in four or more tanks connected in series, more preferably between four and eight such Pachuca tanks.

The ion exchange resin should have a higher affinity for the selected precious metal to be recovered (e.g., gold or silver) than the carbon-based material. Accordingly, strong-base anion (SBA) exchange resins are commonly employed, through certain medium-base resins may also be employed. These resins generally contain quaternary ammonium functional groups with fixed positive charges. A commercial example of a strong-base ion exchange resin is Purolite™ A194™ and A500™. The gold loading efficiency of these resins is not pH sensitive and they can operate effectively across the entire pH range. Medium base resins contain a mixture of tertiary, secondary, and primary amine groups. Commercial examples are Purolite™ S992™ and BASF™ Aurix™. Examples of other chelating resins include Purolite™ MTS8140™, MTS9200™, and MTS9240™ and DuPont™ AmberSep 91419™, AmberSep 21KXLT™, and AmberLyst A21™. The sorbed precious metal can be eluted by any eluant suitable for the particular resin, such as a thiourea/sulfuric acid eluant, an isothiouronium eluant, a thiol resin, a polythionate eluant, an alkali such as sodium hydroxide, and the like.

Other previous metal recovery processes can be employed such as cementation (e.g., zinc or aluminum precipitation) and electrowinning.

EXPERIMENTAL

The following examples are provided to illustrate certain embodiments of the invention and are not to be construed as limitations on the invention, as set forth in the appended claims. All parts and percentages are by weight unless otherwise specified.

The catalyzed thiosulfate leach of gold from oxide ores has been evaluated. The pretreatment process of U.S. Pat. No. 10,161,016 was tested but it was sometimes difficult to reproduce results. Since a process that can increase the recovery of gold in thiosulfate leaching to such extent is promising, it was decided to further investigate it. Therefore, the objective was to understand the effect of activated carbon during the pretreatment and during the thiosulfate leaching of gold, the causes behind the lack of reproducibility, and the mechanism by which a pretreatment with carbon could yield high gold recoveries from what otherwise would be considered as a thiosulfate-refractory ore. The experimental work determined that it is possible to increase gold recovery from certain ores without the need for ammonia or copper, and at low temperatures and atmospheric pressures, by adding small amounts of fine carbon during the thiosulfate leach of gold.

The addition of fine activated carbon resulted in increased dissolution rates and gold recoveries. It has been hypothesized that activated carbon and gold form a galvanic couple, and that oxygen reduction rate is increased due to the increased surface area available on activated carbon. The use of activated carbon as catalyst in the thiosulfate leach of gold is a process alternative that may not require the addition of surrogate oxidants (like copper) and that can work at lower temperatures, making it a more attractive option for the leaching of gold when cyanide use is not an option.

In a first series of experiments, three samples used were ground in a rod mill using tap water and at a pulp density of 60 wt. %. to a $P_{80}$ of 75 μm. The ground material was then homogenized and split into 200-g charges for leach test work. A 200-g charge was further split into 25-g charges for head assays. Solids were assayed for gold by fire assay followed by acid digestion and analyzed by AAS. Some samples were also analyzed for carbon speciation; total carbon was determined by LECO, organic carbon was also determined by LECO after inorganic carbon was removed by HCI digestion. Inorganic carbon was determined by the difference between total and organic carbon. Solutions were assayed for gold by AAS, for copper and other metals by ICP, and for thiosulfate and polythionates by ion chromatography.

Calcium thiosulfate resin-in-leach (RIL) experiments were performed in 1-L stainless steel stirred tanks. Unless otherwise specified, experimental conditions were: 50 degrees Celsius, pH 8 (adjusted and maintained with a 20 wt. % lime slurry), 0.1 M calcium thiosulfate (CaTS), 20 ppm Cu(II) (as $CuSO_4 \cdot 5H_2O$), 0.5 L/min $O_2$, 35 wt. % solids, 20 ml/L resin (Purolite A500™ (which is a macroporous polystyrene crosslinked with divinylbenzene)), and 24 hour residence time; agitation was set at 400 rpm. The activated carbon added to the leach experiments was ground using mortar and pestle; its particle size was not measured.

300 g of solids were slurried in DI water at the desired pulp density and heated to the target temperature in a water bath. After reaching the reaction temperature the resin was added to the reaction vessel, and then the calculated amounts of calcium thiosulfate and copper sulfate were added to the reactor. Finally, oxygen sparging was started, and this was considered as the beginning of the test. Slurry samples were generally collected at 1, 3, 6 and 24 hours. The resin in the samples was first screened and returned to the leach tank and the remaining slurry was filtered, and the solids washed thoroughly washed with DI water. The solids were dried in an oven at 50 degrees Celsius overnight, and then assayed for gold and, in some instances, for carbon speciation. The solutions were analyzed for gold and polythionates speciation. For the leach tests in the presence of activated carbon, the carbon was ground using mortar and pestle; its particle size was not measured.

The ore pretreatment conditions were 50 degrees Celsius, pH 8, 0.5 L/min $O_2$, pH 8, 35 wt. % solids, 90 g of activated carbon per kg of ore, and 400 rpm. The duration of the pretreatment was six hours. Activated carbon was screened after the pretreatment, and the solids were re-slurried at the desired pulp density for the RIL experiment.

The gold grade in samples S1, S2 and S3 was 1.41, 2.54 and 3.63 g/ton, respectively. Organic carbon was only found in sample S3 (1.56 wt. %). The mineralogy of the three samples is shown in Table 1. Although samples S1 and S2 contained 1.6% pyrite, the leaching results suggest that most of the gold was exposed.

TABLE 1

Sample mineralogy.

| Mineral | Ideal Chemical Formula | Sample S1 | Sample S2 | Sample S3 |
|---|---|---|---|---|
| Quartz | $SiO_2$ | 96.4 | 98.3 | 59.7 |
| Jarosite | $KFe_3(SO_4)2(OH)_6$ | 1.9 | | |
| Pyrite | $FeS_2$ | 1.9 | 1.7 | |
| Calcite | $CaCO_3$ | | | 6.3 |
| Dolomite | $CaMg(CO_3)_2$ | | | 20.8 |
| Gypsum | $CaSO_4 \cdot 2H_2O$ | | | 4.9 |
| Kaolinite | $Al_2Si_2O_5(OH)_4$ | | | 4.2 |
| Micas | $KAl_2(AlSi_3O_{10})(OH)_2$ | | | 4.1 |

FIG. 2 shows the effect of the carbon pretreatment on the dissolution of gold from sample S1. A cyanide leach test was also conducted for reference, and the recovery was 81.3%. The 24-h recovery of gold in the baseline thiosulfate RIL experiment was 26.2%. The cyanide and thiosulfate leach recoveries for sample S1 were 81.3 and 26.2%, respectively, indicating that the ore was refractory to thiosulfate leach; the possible causes for this refractoriness are thought to be related to the rate of oxygen reduction on the surface of gold. The results for two thiosulfate leach tests where the ore was pretreated according to the method of U.S. Pat. No. 10,161, 016 are also shown in FIG. 2. Both pretreatments were conducted at the same conditions; both experiments increased both the dissolution rate of gold and its final recovery to 80.1-85.8% but the experiment was not reproducible. Nevertheless, the positive effect of the pretreatment on the thiosulfate leach of gold was clear. Based on these and previous observations, the objective of further experiments was to address two questions: first, how does the pretreatment with carbon affect the ore so that gold recovery by thiosulfate leach increases, and second, why was reproducibility not always achieved in these tests?

An important observation in these tests was that some trithionate (20-40 ppm) and tetrathionate (15-25 ppm) were observed throughout the thiosulfate leach tests in which the ore had been pretreated with carbon, but not in the baseline experiment. This observation led to the hypothesis that some activated carbon fines were deporting to the thiosulfate leach, and that this carbon was related to the increase in gold recovery. In fact, the residues of the leach tests where the feed was pretreated were assayed for organic carbon, and it was found that the content was 0.08 wt. % (no carbon was initially present in the sample).

To test this hypothesis, additional tests were performed where fine activated carbon (1-10 g/kg of ore) was added during the RIL leach. The effect of adding fine activated carbon (1-10 g/kg) to the CaTS-RIL tests is shown in FIG. 3. First, increasing the content of carbon from 1 to 5 g/kg resulted in an increase in the dissolution kinetics of gold, and increased gold recovery from 72.3 to 83.0%; a further increase in the content of carbon to 10 g/kg also resulted in an increase in recovery (84.4%) and slightly faster kinetics. Second, the addition of 1 g/kg of carbon produced a dissolution curve that was similar to that observed in the first carbon pretreatment experiment. Finally, the duplicate experiments at 5 g/kg carbon yielded reproducible results. These results support the hypothesis that fine activated carbon deporting to the RIL was the cause for the increased recoveries observed during RIL after the standard carbon pretreatment of the U.S. Pat. No. 10,161,016.

FIG. 4 shows gold dissolution curves for sample S2 in cyanide and thiosulfate leach experiments. NaCN concentration had to be increased from 0.2 to 2.0 g/L to increase gold recovery from 56.1 to 74.6%; although it is not shown in FIG. 4, the recovery for the 2 g/L NaCN test after 48 hours of leach was 82.0%. Gold dissolution from sample S2 was slower than from sample S1, regardless of the lixiviant used. The recovery of gold by thiosulfate leach in the absence of carbon was 15.4% but it is interesting to note that recovery increased for the first six hours of the test, where recovery was 26.4% but then dropped towards the end of the experiment. This experiment was repeated but the same behavior was observed. The results suggest that gold unloaded from the resin and then precipitated back to the solids. It should also be mentioned that no gold was detected in solution throughout this experiment. However, the addition of fine carbon to the thiosulfate leach experiments with sample S2 also increased gold recovery to 61.4 and 76.4% when fine carbon addition was 10 and 20 g/kg, respectively.

Lastly, FIG. 5 shows the effect of fine carbon on the gold recovery by thiosulfate from sample S3. Sample S3 was not refractory to thiosulfate as samples S1 and S2 were. The addition of fine carbon to this test did not affect gold recovery significantly; in fact, gold recovery decreased from 69.7 to 68.6% when carbon was added to the thiosulfate leach. For the purpose of this work, the main difference between sample S3 and samples S1 and S2 may be the carbon content in each ore (besides the differences in mineralogy). The content of organic carbon in sample S3 was 1.56 wt. % but no carbon was detected in neither sample S1 and S2. Thus, it is believed that the carbon present initially in sample S3 played a similar role to that of the addition of activated carbon. Since carbon was present in the baseline experiment, the addition of fine carbon was not expected to have a significant effect on gold recovery from sample S3.

The leach results observed with the three samples support the hypothesis that fine activated carbon deporting to the thiosulfate leach test was the cause for the increased recoveries observed after the standard carbon pretreatment disclosed in U.S. Pat. No. 10,161,016. The patent disclosed an increase in gold recovery from 60.7 to 71.1% when the duration of the pretreatment was extended from 6 to 24 hours; however, the patent did not disclose significant benefits when increasing the temperature or when using oxygen instead of air during the pretreatment. These teachings agree with the present results and can also be explained by the hypothesis that the carbon fines during the CaTS-RIL are responsible for the increases in gold recovery after the pretreatment. This is, increasing the duration of the pretreatment would increase carbon attrition, whereas the type of gas used, or temperature of the pretreatment would not. Differences in the amount of carbon deporting to the CaTS-RIL tests due to attrition during the carbon pretreatments can also help explain why it was difficult to achieve reproducibility in these experiments.

Up to this point, it can only be concluded that the presence of activated carbon during the thiosulfate leach increased gold recovery, and that reproducibility in the leach tests can be achieved by controlling the content of carbon in these experiments. The RIL experiments in the presence of activated carbon showed that carbon had a positive effect on gold recovery but they do not allow one to conclude about the effect of the carbon pretreatment on the recovery of gold by thiosulfate leaching. Although it is difficult (if not impossible) to prove that the pretreatment with carbon does not have an effect on gold recovery during RIL, unless carbon fines deport to the thiosulfate RIL, it was decided to conduct three different pretreatment experiments.

Preventing carbon attrition during the pretreatment of the ore was difficult, but it was decided to conduct two experiments using sample S1 to try to separate the effect of the pretreatment from the effect of carbon during thiosulfate leach. The first experiment consisted in pre-attriting activated carbon in an attempt to minimize the amount of fine carbon deporting to the RIL tests; the second experiment consisted in using a particular experimental setup. This setup consisted in a mesh pocket with activated carbon in it, that was immersed in a stirred tank containing a slurry with the sample to be pretreated; the slurry was also pumped through the mesh pocket to increase contact between carbon and the solids, while minimizing carbon attrition.

FIG. 6 shows the results for the pretreatments with pre-attrited carbon, and where carbon was placed in a mesh pocket. The recovery for the test where carbon was placed in the mesh pocket was the same as the baseline experiment; that is, the recovery for this test was similar to that observed without pretreatment. The recovery for the test using pre-attrited carbon in the pretreatment showed higher recoveries than the test with the first carbon pre-treatment. However, the RIL tails for the latter experiment were also assayed for carbon, and showed to contain 0.07 wt. % organic carbon. The differences in recovery between the pretreatments with the as-is carbon and with pre-attrited carbon seem to relate to the extent of carbon attrition during the pretreatment, and the amount of fines going to the RIL test. Unfortunately, the tails for the first carbon-pretreatment test were not assayed for carbon speciation.

After 24 hours, 5 g/t of fine carbon was added to the thiosulfate leach test, and resulted in an increase in gold dissolution rate and recovery.

The second experiment consisted in performing a carbon pretreatment on sample S1 followed by removal of the carbon from the solids by flotation prior to leaching with thiosulfate. After the flotation test, the grade of the flotation tails of the carbon pretreated sample was 0.55 g/t; the organic carbon content in the flotation tails was 0.06 wt. %. Other than the differences in ore-carbon contact configuration, the rest of conditions for the pretreatments were the same: 50 degrees Celsius, pH 8, 35 wt. % solids, 0.5 L/min $O_2$, and six hours.

Two RIL tests were conducted on the flotation tails; a baseline experiment with no carbon added, and a RIL test in the presence of 10 g/kg fine carbon (see FIG. 7). The 24-h recovery of the baseline experiment was 3.6%, whereas the addition of fine carbon resulted in an increase in gold recovery to 63.6% after six hours of leaching. The results of these experiments suggest that the pretreatment with carbon as disclosed in U.S. Pat. No. 10,161,016 had no direct effect on thiosulfate leaching and that the fine carbon generated during the pretreatment caused the increased recoveries observed during the thiosulfate leach.

To explain the effect of carbon on the thiosulfate recovery of gold it is now hypothesized that carbon and gold form a galvanic couple where carbon acts as a cathode, thus providing an extended surface for the reduction of cupric ions or oxygen, and gold acts as anode and dissolves. Gold is the most noble metal under in the absence of lixiviants, However, in the presence of lixiviants the reduction potential of gold is affected, which allows gold dissolution to occur in aqueous solutions, at least from a thermodynamic perspective. The standard potentials for gold in water and in the presence of thiosulfate are listed in Table 2, all values are reported against the standard hydrogen electrode (SHE). Table 2 also includes the reduction potentials for gold and carbon at the thiosulfate leach conditions used in this work (50 degrees Celsius, pH 8, 0.1 M thiosulfate, $1.24 \times 10^{-5}$ M $CO_2$, $5.08 \times 10^{-8}$ M $Au(S_2O_3)_2^{3-}$).

TABLE 2

Standard reduction potentials for gold and carbon

| Reaction | Standard Potential | Potential at Leach Conditions |
| --- | --- | --- |
| $Au^+ + e^- \rightarrow Au$ | $E^0 = 1.83$ V | Not calculated |
| $4H^+ + CO_2 + 4e^- \rightarrow C + 2H_2O$ | $E^0 = -0.21$ V | $E = 0.38$ V |
| $Au(S_2O_3)_2^{3-} + e^- \rightarrow Au + 2S_2O_3^{2-}$ | $E^0 = -0.15$ V | $E- = 0-.19- V-$ |

In the thiosulfate system, the reduction potential of gold is lower than that of carbon by 192 mV; this means that if carbon and gold were to form galvanic couples, carbon would be cathodically protected by gold, and the dissolution of gold would probably be accelerated due to carbon acting as an extended surface for the electrochemical reduction of oxygen (see FIG. 8).

It is known that the dissolution rate of a gold electrode increases when connected to a pyrite electrode. It is further known that gold dissolution rates increase in leach experiments where gold was in the presence of pyrite. This has been attributed to o galvanic interactions between gold and different sulfides (pyrite, chalcopyrite, chalcocite and marcasite). It was reported that the dissolution rate of the gold electrode increased linearly with an increase in the area of the pyrite electrode, which is equivalent to what is observed in FIG. 9, which shows the final recoveries at different carbon concentrations for the results presented so far.

The effect of different variables on the robustness of the carbon catalyzed thiosulfate leaching of gold was evaluated. The objective of the following experiments was not to optimize the process but assess the sensitivity of the recovery to the concentrations of Cu(II) and thiosulfate, the addition of resin, and temperature.

FIG. 10 further shows the effect of Cu(II) on gold recovery by thiosulfate in the presence of 10 g/kg carbon. The dissolution curves with and without Cu(II) showed that there was no effect of cupric ions on final gold recovery or its dissolution kinetics. The reduction of oxygen on gold surfaces has been reported to be slow by different authors in ammonia-thiosulfate systems, and more recently in ammonia-free systems. To overcome this issue, cupric ions have been typically added in the ammonia-thiosulfate system to increase the dissolution of gold; this is possible because ammonia stabilizes the cupric ions as the $Cu(NH_3)_i^+$ species, thus allowing Cu(II) to oxidize gold. In the absence of ammonia, the reduction of Cu(II) to Cu(I) is fast, which results in a lower solution Eh, which may be insufficient to drive the dissolution of gold at acceptable rates; this may help explain why the addition of cupric ions to the calcium thiosulfate system had no significant effect on either dissolution kinetics or final gold recovery.

Oxygen has been commonly added to the thiosulfate leach system to regenerate the cupric ions, but the addition of oxygen has also been reported to accelerate the degradation of thiosulfate in the presence of Cu(II) species to trithionate and tetrathionate, which is why the addition of oxygen and Eh of the system should be controlled carefully. It has further been reported that addition of 50 ppm Cu(II) to the sodium thiosulfate leach system did not affect gold recoveries, but increased the generation of trithionate and tetrathionate.

FIG. 10 also shows that removing the resin from the test had a detrimental effect on both the dissolution kinetics and final gold recovery. The recovery in the absence of resin was 78.7%, whereas in the presence of resin recovery was 82.3-85.1%. This could be attributed to the stability of the gold-thiosulfate complex, or to a decrease in the concentration gradient at the surface-solution interface which could affect the rate of dissolution of gold.

Decreasing temperature to 30 degrees Celsius (FIG. 10) resulted in slower dissolution kinetics but with a final recovery of 82.3%, which was close to that obtained at 50 degrees Celsius. Therefore, the addition of carbon to the thiosulfate leach system has also the potential to decrease energy requirements. Unfortunately, due to limitations in the amount of sample S1 available for this work, it was not possible to conduct tests at higher carbon dosages and lower temperatures.

FIG. 11 shows the effect of thiosulfate concentration on gold recovery from sample S1, in the presence and absence of 10 g/kg of carbon. In the absence of carbon, the initial dissolution rate of gold increased with increasing thiosulfate concentration; however, in all the tests in the absence of carbon gold recovery decreased with time after 3-6 hours of leach time. The reasons for this behavior were not understood, and it was not possible to continue the study. The addition of carbon helped to solve the problem, and much higher recoveries were observed in such experiments (52 to 70%). However, it was interesting to note that the final recovery decreased with increasing thiosulfate concentration. It is believed that this behavior was specific to this sample and conclusions should not be extrapolated to the other samples tested in this work.

The above results (apart from the carbon pretreatment tests) correspond to tests performed in the presence of ground activated carbon. However, from a process point of view, this would mean that the added carbon would be lost to the leach tails. Therefore, it was decided to conduct a test where coarse carbon was added to the leach test so that it could be recovered afterwards. FIG. 12 shows a comparison of the experiment conducted with coarse activated carbon (70 g/kg) to tests performed with fine carbon at two different dosages (1 and 10 g/kg). The initial rate of dissolution in the presence of coarse carbon was lower than that observed in the experiments with fine carbon; this was expected, as the frequency of contact between coarse carbon and the gold surface would be lower than when fine carbon was used instead. However, the final recovery was 79.4%, which was higher than the recovery in the presence of 1 g/kg of fine carbon (72.3%) but lower than the test in the presence of 10 g/kg (84.4%). The amount of carbon in the tails was 0.11 wt. %, corresponding to losses of 1.1 g/kg (~5% of carbon attrition). The economics of the process should be considered to decide whether the use of fine or coarse carbon is the best alternative.

The degradation of thiosulfate is an important factor from economic and chemical points of view. The generation of tetrathionate, particularly, has been associated to gold losses due to gold precipitation reactions. The main thiosulfate degradation products observed in this work were trithionate and tetrathionate but pentathionate and hexathionate were also observed in some instances, although they were not quantified. Thiosulfate consumption was lower than 2.11 g of thiosulfate per kg of ore, but there was no clear correlation between thiosulfate degradation and the operating conditions.

TABLE 3

Summary of gold recovery and thiosulfate consumption.

| Test ID | Ore | Temp. °C. | $[S_2O_3^{2-}]$ M | [Cu(ll)] Mg/L | [Resin] cc/L | [C] g/kg | Recovery % | $S_2O_3^{2-}$ consumption g/kg |
|---|---|---|---|---|---|---|---|---|
| CaTS (1) | S1 | 50 | 0.10 | 20 | 20 | 0 | 26.2 | 0.00 |
| CaTS (2) | S1 | 50 | 0.10 | 20 | 20 | Pretreatment | 80.1 | 0.06 |

TABLE 3-continued

Summary of gold recovery and thiosulfate consumption.

| Test ID | Ore | Temp. °C. | $[S_2O_3^{2-}]$ M | [Cu(II)] Mg/L | [Resin] cc/L | [C] g/kg | Recovery % | $S_2O_3^{2-}$ consumption g/kg |
|---|---|---|---|---|---|---|---|---|
| CaTS (11) | S1 | 50 | 0.10 | 20 | 20 | Pretreatment | 85.8 | 0.00 |
| CaTS (3) | S1 | 50 | 0.10 | 20 | 20 | 1 | 72.3 | 0.00 |
| CaTS (4) | S1 | 50 | 0.10 | 20 | 20 | 5 | 83.0 | 0.61 |
| CaTS (13) | S1 | 50 | 0.10 | 20 | 20 | 5 | 85.1 | 0.3.6 |
| CaTS (8) | S1 | 50 | 0.10 | 0 | 20 | 5 | 85.1 | 0.60 |
| CaTS (9) | S1 | 50 | 0.10 | 20 | 0 | 5 | 78.7 | 0.91 |
| CaTS (10) | S1 | 50 | 0.10 | 0 | 0 | 5 | 78.7 | 2.11 |
| CaTS (5) | S1 | 50 | 0.10 | 20 | 20 | 10 | 84.4 | 1.10 |
| CaTS (12) | S1 | 30 | 0.10 | 20 | 20 | 10 | 82.3 | 0.56 |
| CaTS (17) | S2 | 50 | 0.10 | 20 | 20 | 0 | 15.4 | 0.14 |
| CaTS (18) | S2 | 50 | 0.10 | 20 | 20 | 10 | 61.4 | 1.44 |
| CaTS (24) | S2 | 50 | 0.10 | 20 | 20 | 0 | 15.4 | 0.09 |
| CaTS (27) | S2 | 50 | 0.10 | 20 | 20 | 20 | 76.4 | 1.28 |
| CaTS (28) | S2 | 50 | 0.20 | 20 | 20 | 0 | 8.3 | 0.00 |
| CaTS (29) | S2 | 50 | 0.05 | 20 | 20 | 10 | 69.7 | 0.09 |
| CaTS (30) | S2 | 50 | 0.05 | 20 | 20 | 0 | 10.2 | 0.00 |
| CaTS (31) | S2 | 50 | 0.20 | 20 | 20 | 10 | 52.4 | 1.16 |
| CaTS (32) | S3 | 50 | 0.10 | 0 | 20 | 0 | 69.7 | 1.36 |
| CaTS (33) | S3 | 50 | 0.10 | 0 | 20 | 10 | 68.6 | 0.71 |

After it was confirmed that carbon fines were necessary to be present during the thiosulfate leaching of gold to catalyze the reaction, an experiment was performed to determine if carbon-solids contact was necessary to attain this effect. The experiment consisted in placing coarse activated carbon in a mesh pocket inside the RIL tank to minimize the contact between carbon and solids. FIG. 13 shows that gold recovery for this C-in-mesh experiment was very similar to that observed for the baseline experiment. FIG. 13 also shows that high dissolution rates and gold recoveries were obtained when temperature was decreased to 30° C., and also when neither copper sulfate or resin were added to the leach test.

Finally, FIG. 14 shows the effect of fine carbon on the thiosulfate leach of sample S2. Gold dissolution kinetics in sample S2 were slower than those observed with sample S1, both in the presence of cyanide and of thiosulfate. Compared to sample S1, sample S2 required longer residence times and higher NaCN concentrations to achieve complete recovery of the exposed gold. The baseline RIL thiosulfate experiment showed increasing gold recoveries for the first six hours; however, gold recovery dropped from 42.1 to 15.4% at the end of the experiment. The 15.4% recovery calculated from the tails assay agreed well with the recovery calculated from the gold assayed in the resin (16.1%). It has commonly been suggested that the reduction of oxygen is slow and that a catalyst is necessary to obtain acceptable kinetics. The results above show that in the presence of activated carbon, copper was not necessary to leach gold at acceptable leach rates.

The effect of activated carbon in the thiosulfate leaching of gold was evaluated. It was shown that fine activated increased gold recovery and its dissolution kinetics in the calcium thiosulfate leach system. It is believed that carbon and gold form a galvanic couple where the additional area provided by activated carbon increases the reduction of oxygen, thus increasing the electrochemical oxidation of gold. In the presence of fine carbon the addition of cupric ions had no effect on either gold recovery or its dissolution rate; it was also possible to decrease the leach temperature from 50 to 30 degrees Celsius and still obtain high gold recoveries. Coarse carbon could be used instead of fine carbon to decrease carbon losses to the tails, though process economics must be considered. Thiosulfate degradation was within 2.11 kg/ton, with trithionate and tetrathionate as the main degradation products.

The present results make the use of activated carbon as a catalyst in the thiosulfate leaching of gold an attractive process alternative in situations where cyanide use is not possible. This process, however, would be limited to stirred/fluidized reactors, and could not be applied to heap leaching.

A number of variations and modifications of the invention can be used. It would be possible to provide for some features of the invention without providing others.

For example in one alternative embodiment, the powdered activated carbon is added to a slurry comprising thiosulfate, the precious metal-bearing material and the oxidant during leaching of the precious metal.

In another alternative embodiment, the pretreatment process of U.S. Pat. No. 10,161,016 is first applied to the precious metal-bearing material, followed by carbon removal and addition of thiosulfate and finely sized carbon material. In the optional pre-treatment step (not shown in FIG. 1) performed before leaching is, the precious metal-bearing material is mixed with the carbon-based material and water to form a slurry and, after pre-treatment, the slurry is contacted with the thiosulfate lixiviant. Accordingly, the pre-treatment is commonly performed in the substantial absence of thiosulfate lixiviant. Typically, the pre-treatment slurry comprises no more than about 0.02 M, more typically no more than about 0.01 M, and even more typically no more than about 0.005 M thiosulfate. Proper reaction conditions during optional pre-treatment can provide relatively high leaching kinetics. Typically, the pre-treatment process is conducted at atmospheric pressure and temperature, though the use of a higher operating temperature (e.g., typically about 25° C. or higher, more typically about 35° C. or higher, and even more typically about 50° C. or higher and, in some applications typically in the range of from about 25° C. to about 65° C.) can provide improved reaction kinetics. The pH of the slurry is typically about pH 7 or higher, more typically about pH 8 or higher, and even more typically about pH 9 or higher. The oxidation-reduction potential ("ORP") of the slurry is typically greater than about 100 mV and more typically greater than about 200 mV and typically less than about 750 mV and more typically less than about 500 mV (Ag/AgCl electrode). The rate of sparging of the oxidant (e.g., molecular oxygen) through the slurry during precious metal recovery typically ranges from about 0.05 to about 5 and more typically from about 0.10 to about 2.5 L $O_2$/L slurry/min. The residence time of the slurry in the mixing vessel typically ranges from more than about 1 hour to about 24 hours, depending on the temperature, dissolved oxygen concentration in solution, and the ore type. Typically, the pulp density ranges from about 20 to about 50% solids by weight, but could be as low as about 1% or as high as about 60%. The typical solids content of the slurry ranges from about 20 to about 30 wt. %. Ultimately, the treatment conditions, particularly time and temperature of the leaching process, carbon-based material dosage, and rate of oxygen addition, are adjusted to optimize precious metal recovery. This alternative may require less finely sized carbon to be consumed to realize a relatively high precious metal recovery.

In another embodiment, coarsely sized carbon-based material is added during the thiosulfate leach in addition to the ion exchange resin (which has a greater affinity for the dissolved precious metal than the carbon-based material) followed by carbon-based material removal, such as by screening, after the leach stage and before disposal of the residue to tailings. "Coarse" carbon-based material typically has a $P_{80}$ size of at least about 80 mesh sieve (0.177 mm) and more typically of at least about 50 mesh (0.297 mm). Typically, coarse carbon-based material includes, for example, granular activated carbon, extruded activated carbon, and bead activated carbon.

The present invention, in various embodiments, configurations, or aspects, includes components, methods, processes, systems and/or apparatus substantially as depicted and described herein, including various embodiments, configurations, aspects, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A process, comprising:
    a) providing a particulate carbon-based material comprising one or more of activated carbon, activated charcoal, coke, hard carbon derived from at least one of coconut shells and elemental carbon, a calcined resin, and mixtures thereof;
    b) providing a precious metal-bearing material;
    c) contacting the precious metal-bearing material with the particulate carbon-based material, thiosulfate, an anion exchange resin, and an oxidant to form a slurry comprising a slurried precious metal-bearing material, wherein a weight ratio of the precious metal-bearing material to particulate carbon-based material is more than 125:1; and
    d) leaching a precious metal from the slurried precious metal-bearing material to form a leached precious metal-bearing material, wherein the anion exchange resin has a greater affinity for the leached precious metal than the particulate carbon-based material.

2. The process of claim 1, wherein the precious metal-bearing material is free of pretreatment by prior contact with the particulate carbon-based material and the oxidant.

3. The process of claim 1, wherein the precious metal-bearing material is contacted with at least most of the thiosulfate before contact with the oxidant, wherein the precious metal-bearing material contains more oxides than sulfides, wherein the precious metal-bearing material is substantially free of organic carbon before contact with the particulate carbon-based material, and wherein the precious metal-bearing material is refractory to thiosulfate leaching.

4. The process of claim 1, wherein the precious metal-bearing material is contacted with at least most of the anion exchange resin before contact with the oxidant, wherein the precious metal-bearing material is an oxide ore that is amenable to precious metal recovery by cyanidation, wherein the precious metal-bearing material has an average precious metal-bearing material particle size, wherein the particulate carbon-based material has an average carbon particle size, and wherein the average carbon particle size is more than the average precious metal-bearing material particle size and further comprising:
after the leaching (d), removing the particulate carbon-based material from the leached precious metal-bearing material by screening.

5. The process of claim 1, wherein the oxidant is molecular oxygen, wherein the slurry in the leaching (d) has a pH from about pH 7 to about pH 12, a thiosulfate concentrate of from about 0.005 to about 2 M, a total copper concentration of no more than about 20 ppm, and an oxidation-reduction potential ranging from about 100 to about 350 mV versus a standard hydrogen electrode (SHE) and is performed in the complete absence of added copper, and wherein a rate of contact of the molecular oxygen with the slurry during the leaching (d) is at least 0.10 L $O_2$/L slurry/min, and wherein a weight ratio of the precious metal-bearing material to particulate carbon of more than about 200:1.

6. The process of claim 1, further comprising:
removing at least about 95% of the particulate carbon-based material from the slurry after the leaching (d).

7. The process of claim 1, wherein the precious metal-bearing material is contacted with at least most of the thiosulfate before the precious metal-bearing material is contacted with at least most of the particulate carbon-based material and wherein the anion exchange resin comprises a strong-base or a medium-base resin.

8. The process of claim 1, wherein the precious metal-bearing material is contacted with at least most of the anion exchange resin before the precious metal-bearing material is contacted with at least most of the particulate carbon-based material and wherein the precious metal-bearing material comprises no more than about 0.01 wt. % organic carbon before contact with the particulate carbon-based material.

9. A process, comprising:
a) contacting a precious metal-bearing material with a carbon-based material and one or more of a thiosulfate lixiviant and an anion exchange resin to form a slurry, wherein a weight ratio of the precious metal-bearing material to the carbon-based material is more than 125:1;
b) thereafter contacting the slurry with an oxidant to leach a precious metal from the precious metal-bearing material to form a leached precious metal-bearing material and deposit the leached precious metal onto the anion exchange resin to form a precious metal-containing anion exchange resin; and
c) contacting the precious metal-containing anion exchange resin with an eluant to form a precious metal-containing eluant and a barren ion exchange resin for recycle to the contacting (a).

10. The process of claim 9, wherein the precious metal-bearing material is free of pretreatment by prior contact with the carbon-based material and the oxidant, wherein the carbon-based material has an average carbon particle size and the precious metal-bearing material has an average precious metal-bearing material particle size, and wherein the average carbon particle size is more than the average precious metal-bearing material particle size, and further comprising:
after the contacting (c), removing the carbon-based material from the leached precious metal-bearing material to form a carbon-depleted slurry, wherein the carbon-based material is removed by screening.

11. The process of claim 10, wherein at least about 95% of the carbon-based material is removed from the slurry.

12. The process of claim 9, wherein the precious metal-bearing material is contacted with at least most of the thiosulfate lixiviant before contact with the oxidant, wherein the precious metal-bearing material contains more oxides than sulfides, wherein the precious metal-bearing material is substantially free of organic carbon before contact with the carbon-based material, and wherein a precious metal recovery by thiosulfate leaching of the precious metal-bearing material in the absence of prior contact with the carbon-base material is less than a precious metal recovery by thiosulfate leaching of the precious metal-bearing material after prior contact with the carbon-based material.

13. The process of claim 9, wherein the oxidant is molecular oxygen, wherein, during the thereafter contacting (b), the slurry has a pH of from about pH 7 to about pH 12, a thiosulfate concentrate from about 0.005 to about 2 M, a total copper concentration of no more than about 20 ppm, and an oxidation-reduction potential ranging from about 100 to about 350 mV versus standard hydrogen electrode (SHE), wherein a rate of contact of the molecular oxygen with the slurry during the thereafter contacting (b) is at least 0.10 L $O_2$/L slurry/min, wherein the weight ratio of the precious metal-bearing material to carbon-based material is more than about 200:1, wherein the precious metal-bearing material is contacted with at least most of the anion exchange resin before contact with the oxidant, wherein the precious metal-bearing material is an oxide ore that is amenable to precious metal recovery by cyanidation, and wherein at least part of the precious metal-bearing material is refractory to recovery of the precious metal by thiosulfate leaching.

14. The process of claim 9, wherein the precious metal-bearing material is contacted with at least most of the thiosulfate lixiviant before the precious metal-bearing material is contacted with at least most of the carbon-based material and wherein the anion exchange resin comprises a strong-base or a medium-base resin.

15. The process of claim 9, wherein the precious metal-bearing material is contacted with at least most of the anion exchange resin before the precious metal-bearing material is contacted with at least most of the carbon-based material and wherein the precious metal-bearing material comprises no more than about 0.01 wt. % organic carbon before contact with the carbon-based material.

16. The process of claim 9, wherein, after the contacting (a), the slurry comprises more than 0.005 molar thiosulfate and wherein the thereafter contacting in (b) is performed in the absence of added copper.

17. A process, comprising:
a) contacting a precious metal-bearing material with a particulate carbon-based material, thiosulfate, and an anion exchange resin to form a slurry comprising a slurried precious metal-bearing material, wherein a weight ratio of the precious metal-bearing material to particulate carbon-based material is more than 125:1; and
b) contacting the slurry with an oxidant to leach a precious metal from the slurried precious metal-bearing material to form a leached precious metal-bearing material, wherein a total copper concentration in the slurry is no more than about 10 ppm.

18. The process of claim 17, wherein the precious metal-bearing material is free of pretreatment by prior contact with the particulate carbon-based material and the oxidant, wherein the weight ratio of the precious metal-bearing material to particulate carbon-based material is more than 150:1.

19. The process of claim 17, wherein the precious metal-bearing material is contacted with at least most of the thiosulfate before contact with the oxidant, wherein the precious metal-bearing material contains more oxides than sulfides, wherein the precious metal-bearing material is substantially free of organic carbon before contact with the particulate carbon-based material, and wherein the precious metal-bearing material is refractory to thiosulfate leaching.

20. The process of claim 17, wherein the precious metal-bearing material is contacted with at least most of the anion exchange resin before contact with the oxidant, wherein the precious metal-bearing material is an oxide ore that is amenable to precious metal recovery by cyanidation, wherein the precious metal-bearing material has an average precious metal-bearing material particle size, wherein the particulate carbon-based material has an average carbon particle size, and wherein the average carbon particle size is more than the average precious metal-bearing material particle size and further comprising:

after the contacting (b), removing at least about 95 wt. % of the particulate carbon-based material from the leached precious metal-bearing material by screening.

* * * * *